United States Patent
Kubo

(10) Patent No.: US 12,174,404 B2
(45) Date of Patent: Dec. 24, 2024

(54) LIGHT-CONTROLLING DEVICE

(71) Applicant: CANON KABUSHIKI KAISHA, Tokyo (JP)

(72) Inventor: Wataru Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 17/340,572

(22) Filed: Jun. 7, 2021

(65) Prior Publication Data

US 2021/0294008 A1    Sep. 23, 2021

Related U.S. Application Data

(63) Continuation of application No. PCT/JP2019/046759, filed on Nov. 29, 2019.

(30) Foreign Application Priority Data

Dec. 10, 2018 (JP) .................. 2018-230713
Oct. 25, 2019 (JP) .................. 2019-194474

(51) Int. Cl.
*G02B 5/20* (2006.01)
*G02F 1/17* (2019.01)
*G02F 1/1514* (2019.01)

(52) U.S. Cl.
CPC .............. *G02B 5/205* (2013.01); *G02F 1/172* (2013.01); *G02F 2001/15145* (2019.01)

(58) Field of Classification Search
CPC ......... G02B 5/205; G02B 5/223; G02F 1/172; G02F 2001/15145; H04N 25/00
See application file for complete search history.

(56) References Cited

U.S. PATENT DOCUMENTS

| 6,020,987 A * | 2/2000 | Baumann ................. C09K 9/02 359/273 |
| 2012/0314272 A1 | 12/2012 | Yamada |
| 2018/0052375 A1 | 2/2018 | Yamada |

FOREIGN PATENT DOCUMENTS

| CN | 107850814 A | 3/2018 |
| JP | H06301065 A | 10/1994 |

(Continued)

*Primary Examiner* — James C. Jones
(74) *Attorney, Agent, or Firm* — Canon U.S.A., Inc. I.P. Division

(57) ABSTRACT

A light-controlling device contains a plurality of compounds, wherein the plurality of compounds are compounds having different absorption wavelengths, the light-controlling device has a variable transmittance $VT(\lambda)$ obtained by combining light absorption characteristics changes of the plurality of compounds, and $CR_{Max} < CR_{MaxFP}$ is satisfied.

$CR_{Max}$ is a maximum value among ratios of a signal strength ratio of transmitted light in a transmission state and a signal strength ratio of transmitted light in a light reduction state (light reduction state/transmission state or transmission state/light reduction state) in detection light wavelength regions of a photodetector.

$CR_{MaxFP}$ is $CR_{Max}$ at a concentration ratio of the plurality of compounds at which wavelength flatness TF of $VT(\lambda)$ in the detection light wavelength regions has a minimum value $TF_{FP}$.

27 Claims, 16 Drawing Sheets

(56) References Cited

FOREIGN PATENT DOCUMENTS

| | | |
|---|---|---|
| JP | 2000292815 A | 10/2000 |
| JP | 2001189941 A | 7/2001 |
| JP | 4681121 B2 | 5/2011 |
| JP | 2012-133027 A | 7/2012 |
| JP | 2012137649 A | 7/2012 |
| JP | 2017-21327 A | 1/2017 |
| JP | 2018-10084 A | 1/2018 |
| JP | 2018-84805 A | 5/2018 |
| WO | 99-04316 A5 | 1/1999 |
| WO | 2017010360 A1 | 1/2017 |

* cited by examiner

LIGHT-CONTROLLING DEVICE

CROSS-REFERENCE TO RELATED APPLICATIONS

This application is a Continuation of International Patent Application No. PCT/JP2019/046759, filed Nov. 29, 2019, which claims the benefit of Japanese Patent Application Nos. 2018-230713, filed Dec. 10, 2018 and 2019-194474, filed Oct. 25, 2019, all of which are hereby incorporated by reference herein in their entirety.

TECHNICAL FIELD

The present invention relates to a light-controlling device.

BACKGROUND ART

An ND (neutral density) filter, which is one of light-controlling devices, is a filter that reduces the amount of light while suppressing the influence on color and is widely used for capturing still images and moving images. In recent years, variable ND filters in which the degree of light reduction of ND filters can be electrically changed have been put to practical use, which enables an image expression that has not been realized so far. Such a variable ND filter contains a plurality of compounds whose light absorption characteristics change with an external stimulus (in particular, electrically). The "light absorption characteristics" can also be called as "light transmission characteristics". The combination of light absorption of the plurality of compounds achieves control of the degree of light reduction while suppressing the influence on color.

One of important features of the ND filter is a small influence on color (high color reproducibility). An ideal ND filter has a constant transmittance (the highest wavelength flatness) regardless of the wavelength of transmitted light, and such an ND filter undergoes no color change when the amount of light is reduced. Therefore, in known ND filters, the color reproducibility has been improved by improving the spectral flatness.

PTL 1 discloses an ND filter which includes a multilayer film having high spectral flatness and in which the degree of light reduction does not change (the degree of light reduction is constant). Such an ND filter having high spectral flatness exhibits high color reproducibility.

CITATION LIST

Patent Literature

PTL 1 Japanese Patent Laid-Open No. 2009-175225

A variable ND filter containing a plurality of compounds whose light absorption characteristics change with an external stimulus exhibits ND characteristics by combining absorption spectra of the plurality of compounds. Therefore, it is difficult to achieve high spectral flatness like ND filters in which the degree of light reduction does not change (known ND filters in which the degree of light reduction is constant). The present inventors have attempted to improve the spectral flatness, but it has been difficult to achieve high color reproducibility.

Accordingly, it is an object of the present invention to provide a light-controlling device, such as a variable ND filter, that has high color reproducibility.

SUMMARY OF INVENTION

That is, a light-controlling device according to the present invention is a light-controlling device containing a plurality of compounds,
  wherein the plurality of compounds are compounds having different absorption wavelengths,
  the light-controlling device has a variable transmittance $VT(\lambda)$ obtained by combining light absorption characteristics changes of the plurality of compounds, and $CR_{Max} < CR_{MaxFP}$ is satisfied,
    where $CR_{Max}$ is a maximum value among ratios of a signal strength ratio of transmitted light in a transmission state and a signal strength ratio of transmitted light in a light reduction state (light reduction state/transmission state or transmission state/light reduction state) in detection light wavelength regions of a photodetector, and
    $CR_{MaxFP}$ is $CR_{Max}$ at a concentration ratio of the plurality of compounds at which wavelength flatness TF of $VT(\lambda)$ in the detection light wavelength regions has a minimum value $TF_{FP}$.

Further features of the present invention will become apparent from the following description of exemplary embodiments with reference to the attached drawings.

DESCRIPTION OF EMBODIMENTS

A light-controlling device according to an embodiment of the present invention contains a plurality of compounds and has light absorption in a visible range through superimposition of a plurality of absorption spectra of the compounds. The absorption spectrum of the light-controlling device is obtained with the horizontal axis showing a wavelength and the vertical axis showing a transmittance. By adjusting, for example, the concentration ratio of the plurality of compounds, the absorption spectrum can be brought to a substantially flat spectrum. The light-controlling device according to an embodiment of the present invention is a device in which a greater importance is given to the color reproducibility than to the flatness of an absorption spectrum, and is evaluated based on a parameter $CR_{Max}$ of color reproducibility.

Hereafter, embodiments of the present invention will be described with reference to the attached drawings. The present invention is not limited to embodiments below. Embodiments obtained by, for example, appropriately modifying or improving the embodiments below based on the ordinary knowledge of those skilled in the art without departing from the spirit of the present invention are also within the scope of the present invention.

Optical Apparatus Including Light-Controlling Device

Figure 1:
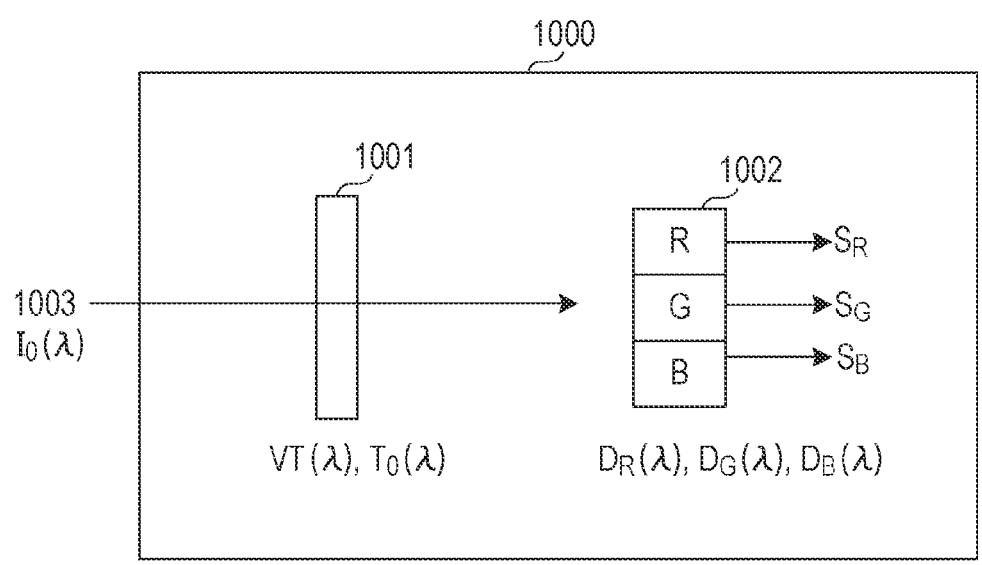
FIG. 1 schematically illustrates an example of an optical apparatus including a light-controlling device according to this embodiment.

FIG. 1 schematically illustrates an example of an optical apparatus including a light-controlling device according to this embodiment. Referring to FIG. 1, an optical apparatus 1000 includes a light-controlling device 1001 such as a variable ND filter and a photodetector 1002, such as an image pickup element, that has a plurality of detection light wavelength regions such as RGB. If a photodetector is disposed separately from the optical apparatus 1000, the optical apparatus 1000 does not necessarily include a photodetector 1002. The optical apparatus according to this embodiment is an optical apparatus including a light-controlling device that absorbs light by combining a plurality of compounds, such as a plurality of compounds whose light absorption characteristics change with an external stimulus. Examples of the optical apparatus include camera systems (including cameras and lenses) with a variable ND filter, transmittance-variable windows, transmittance-variable glasses, and reflectance-variable mirrors.

Photodetector

The light-controlling device according to this embodiment is applied to a particular photodetector. In other words, the light-controlling device is designed so as to exhibit its function when combined with a particular photodetector. Examples of the combination include a combination of a camera system and an image pickup element such as a CMOS sensor, a combination of a transmittance-variable window and a human eye, a combination of transmittance-variable glasses and a human eye, and a combination of a reflectance-variable mirror and a human eye. The photodetector is a photodetector having a plurality of detection light wavelength regions. Specifically, for example, the plurality of detection light wavelength regions are R, G, and B in CMOS sensors for image pickup or the x-bar, y-bar, and z-bar of the CIE color matching functions in a human eye.

Compound Whose Light Absorption Characteristics Change with External Stimulus

The light-controlling device according to this embodiment preferably absorbs light by combining a plurality of compounds whose light absorption characteristics change with an external stimulus. Examples of the external stimulus in this case include an electrical stimulus, a thermal stimulus, a light stimulus, and a pH stimulus. Examples of the compound whose light absorption characteristics change with an external stimulus include electrochromic (hereafter may be referred to as EC) compounds, liquid crystal compounds (including guest-host liquid crystal), thermochromic compounds, photochromic compounds, and pH-responsive compounds. In particular, compounds whose light absorption characteristics electrically change are preferably used from the viewpoints of stability, ease of control from the outside, and response speed. Among the compounds whose light absorption characteristics electrically change, electrochromic compounds (EC compounds) and liquid crystal compounds are preferably used. In particular, EC compounds are preferably used because the light-controlling device containing an EC compound can achieve both the light transmission state with a high transmittance and the light reduction state with a low transmittance.

When a light-controlling device is produced using compounds whose light absorption characteristics change with such an external stimulus, high color reproducibility is not easily achieved from only a light absorption characteristics change of a single compound. Therefore, the light absorption characteristics changes of a plurality of compounds are preferably used. To effectively use the light absorption characteristics changes of a plurality of compounds, it is effective to improve the color reproducibility by selecting compounds having different light absorption wavelengths as the plurality of compounds and combining the strong absorption and the weak absorption.

In the light-controlling device according to this embodiment, the color reproducibility of a variable ND filter is improved by absorbing light through combination of a plurality of compounds whose light absorption characteristics change with an external stimulus. The reason why a plurality of compounds are used is that, if a single compound is used, the shape of a spectrum of a variable ND filter is uniquely determined, and thus the color reproducibility cannot be further improved (beyond the spectrum). The plurality of compounds are preferably three or more compounds. The reason for this will be described below. 1. If many compounds are used when a variable transmittance spectrum is formed by combining compounds having different variable absorption spectra, the absorption wavelength can be complemented in more detail, which can further improve the color reproducibility and can suppress the substantial influence of a light source on color reproducibility. 2. A spectroscope to which the ND filter is applied has three or more detection wavelength regions as exemplified by human eyes or RGB sensors. Therefore, when the plurality of compounds are three or more compounds, the degree of light absorption corresponding to each of the detection wavelength regions can be relatively flexibly set for other compounds, which considerably increases the effect produced by giving a high priority to $CR_{Max}$ in the present invention. Specifically, the number of compounds is preferably four or more and more preferably six or more.

From the above viewpoint, at least one compound selected from the plurality of compounds preferably has a peak of the variable absorption spectrum in each of the plurality of detection light wavelength regions of the photodetector. Thus, the light absorption corresponding to the detection light wavelength regions of the photodetector can be more flexibly set for other compounds. Herein, each of the plurality of detection light wavelength regions of the photodetector refers to a detection wavelength region having the maximum value in a normalized sensitivity spectrum of the photodetector. For example, in FIG. 2(B), the detection light regions of a plurality of detection light wavelength regions (x-bar, y-bar, and z-bar) are x-bar: 580 to 680 nm, y-bar: 500 nm to 580 nm, and z-bar: 425 nm to 500 nm. At least one compound selected from the plurality of compounds preferably has a peak of the variable absorption spectrum in each of the regions.

Principle of Improving Color Reproducibility

In the light-controlling device according to this embodiment, the color reproducibility is improved by, unlike known light-controlling devices, giving a higher priority to reducing a change in the detection signal ratio in each of the plurality of detection light wavelength regions of the photodetector than to improving the spectral flatness. The principle of improving the color reproducibility in the light-controlling device according to this embodiment will be described in detail below.

VT(λ)

A variable transmittance obtained by combining the light absorption characteristics changes (e.g., changed absorption coefficient Δε(λ)) of the plurality of compounds which are contained in the light-controlling device according to this embodiment and whose light absorption characteristics change is referred to as VT(λ). Herein, the changed absorption coefficient Δε(λ) refers to a change component of a molar absorption coefficient calculated by subtracting the molar absorption coefficient of the compound according to this embodiment whose light absorption characteristics change in a transmission state from the molar absorption coefficient of the compound in a light reduction state. The variable transmittance VT(λ) refers to a change component calculated by dividing the transmittance of the light-controlling device according to this embodiment in a light reduction state by the transmittance of the light-controlling device in a transmission state. VT(λ) can be expressed by the following formula (1), where $\Delta\varepsilon_n(\lambda)$ represents a changed absorption coefficient of a certain compound n whose light absorption characteristics change, $C_n$ represents a concentration in the light reduction state, and L represents an optical path length of the light-controlling device.

$$VT(\lambda) = 10^{-L\Sigma\Delta\varepsilon_n(\lambda)C_n} \quad (1)$$

Examples of the optical path length L and the concentration $C_n$ in the light reduction state will be described below. For transmission ND filters, the optical path length L is, for example, a thickness of a layer in which the compounds whose light absorption characteristics change are held. If light is reflected at the back surface of an ND filter and travels back and forth inside the ND filter, the optical path length L is twice the thickness of the layer. The concentration $C_n$ refers to an average concentration of the compounds whose light absorption characteristics change in the light reduction state at the thickness of the layer in which the compounds whose light absorption characteristics change are held. Herein, the light reduction state refers to a state in which the changeable state of the compounds whose light absorption characteristics change is mostly a state brought in the case where the light-controlling device is in the light reduction state compared with the case where the light-controlling device is in the transmission state. Specifically, the light reduction state is, for example, a state of high light absorption in the visible range of EC compounds or dichromatic dyes that have a light absorption characteristics change in the visible range.

TF

Figure 2A:
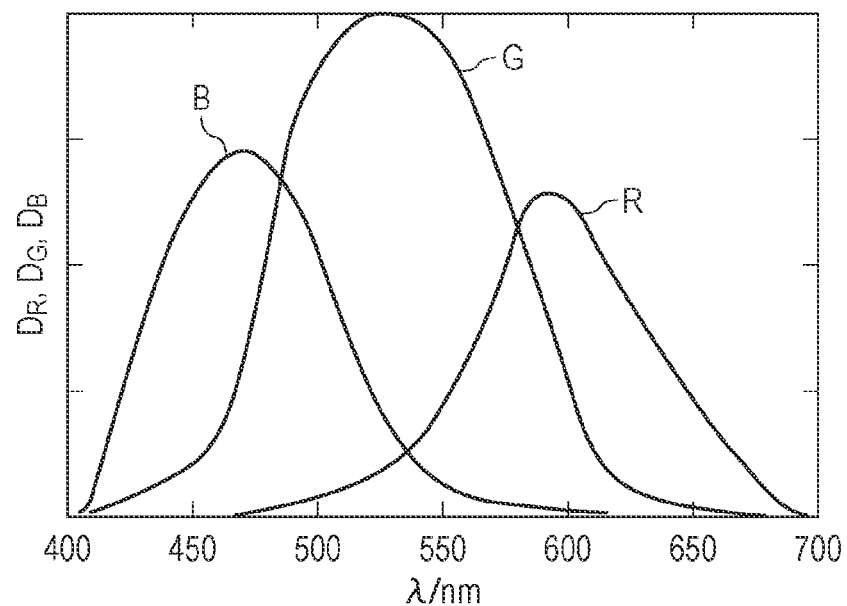
FIG. 2A illustrates an example of the spectral sensitivity of a photodetector.
Figure 2B:
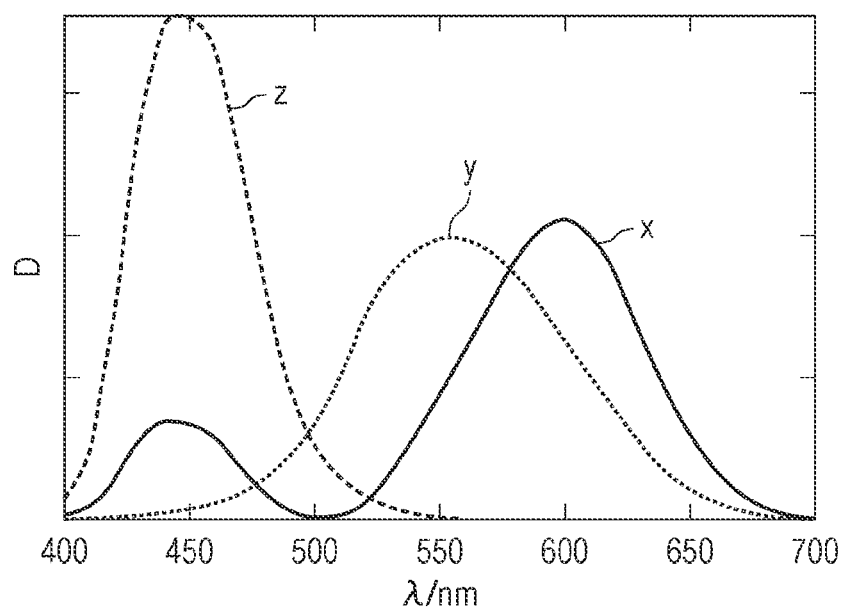
FIG. 2B illustrates an example of the spectral sensitivity of a photodetector.

The wavelength flatness of VT(λ) in the detection light wavelength regions of the photodetector is referred to as TF. The detection light wavelength regions of the photodetector refer to wavelength regions in which the photodetector has a significant spectral sensitivity. The spectral sensitivity of the photodetector refers to a spectral sensitivity obtained when the photodetector is used in its typical configuration. Specifically, in the case where the photodetector is used in a camera system, the spectral sensitivity is a spectral sensitivity obtained when other optical elements such as a UV/IR cut filter and a low-pass filter that are typically used in the camera system are included. FIG. 2A illustrates an example of the spectral sensitivity of an RGB image pickup element, including an influence of a UV/IR cut filter and a low-pass filter on transmittance when the photodetector is used in a camera system. In the case where the photodetector is a human eye, the spectral sensitivity corresponds to the CIE color matching functions. FIG. 2B illustrates the CIE color matching functions. For example, the detection light wavelength region of such a photodetector is typically a wavelength region of 425 nm or more and 680 nm or less. Still another example of the detection light wavelength region is a wavelength region having a sensitivity of 10% or more of the maximum spectral sensitivity of the photodetector. The wavelength flatness TF is determined by dividing the difference in VT(λ) between the maximum value and the minimum value in the detection light wavelength regions of the photodetector by the average of VT(λ) as expressed by the following formula (2).

$$TF = \frac{VT(\lambda)_{Max} - VT(\lambda)_{Min}}{VT(\lambda)_{Ave}} \quad (2)$$

Incident Light

Figure 3A:
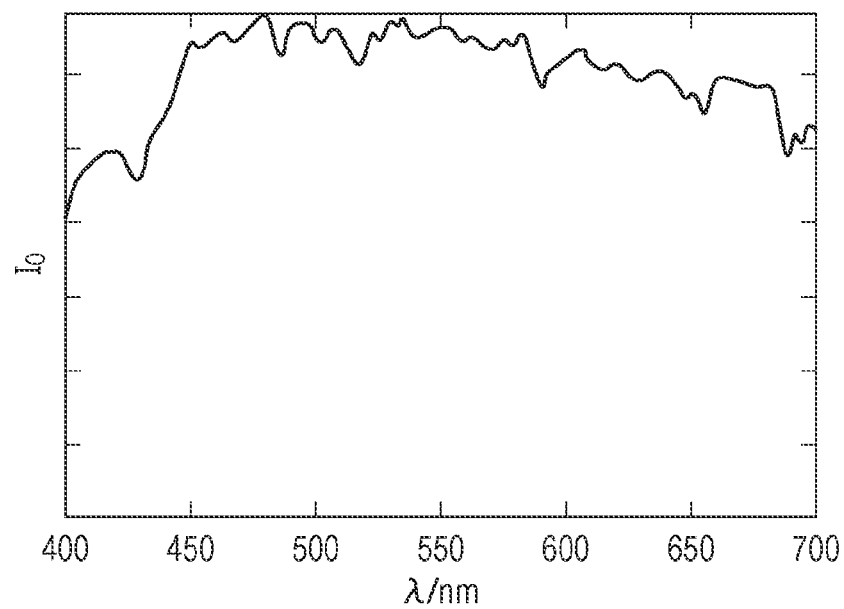
FIG. 3A illustrates an example of a spectrum of a light source.
Figure 3B:
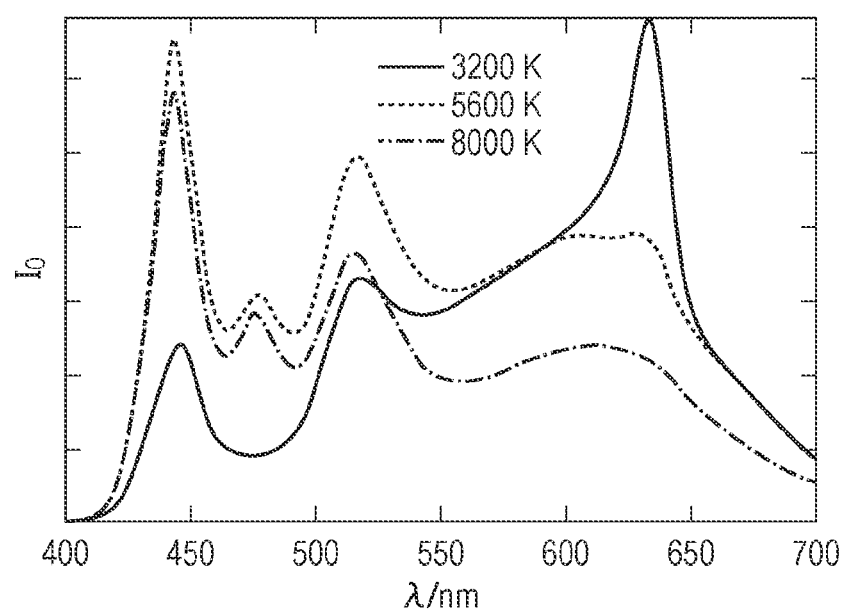
FIG. 3B illustrates an example of a spectrum of a light source.

Light incident on the light-controlling device will be described. A light source of light incident on the light-controlling device is, in the first place, natural light in the daytime during which the light-controlling device is most frequently used. Herein, light-source-emitting light incident on the light-controlling device will be described. The light-source-emitting light incident on the light-controlling device refers to light itself emitted from the source (light source) of light incident on the light-controlling device, or light that has been emitted from the light source and has passed through a filter or the like. For example, when an artificial light source is used for illumination, the light-source-emitting light refers to light emitted from the artificial light source. When light emitted from the artificial light source is used for illumination with a filter or the like, the light-source-emitting light refers to light that has passed through the filter or the like. For example, in consideration of the sunlight on the earth, the light-source-emitting light refers to sunlight that has reached the surface of the earth through the earth's atmosphere. FIG. 3A illustrates an example of a spectrum of natural light in the daytime. Examples of defined light sources include CIE $D_{65}$, $D_{55}$, $D_{50}$, B, and C light sources. The light-controlling device according to this embodiment can preferably support natural light in the daytime in principle. A color temperature is widely used as a scale for expressing the color of light. On the basis of color temperature, the source (light source) of light incident on the light-controlling device can be classified into the following three types: a low color temperature of 1800 K to 4000 K, a medium color temperature of 4000 K to 7000 K, and a high color temperature of 7000 K to 12000 K. Since the source of light incident on the light-controlling device is, in the first place, natural light in the daytime, a medium color temperature is important among the sources of light incident on the light-controlling device. Examples of the light source for low color temperature include CIE A light source, incandescent lamps, and halogen lamps. Examples of the light source for high color temperature include LED light sources having corresponding color temperatures, shade in the daytime, and blue sky. The light sources for such color temperatures are also important after the light source for medium color temperature. The light-controlling device according to this embodiment can preferably support, in the second place, any of medium color temperature, low color temperature, and high color temperature as a source of incident light. For the examples of the light sources corresponding to the color temperatures, FIG. 3B illustrates examples of spectra of light sources corresponding to color temperatures of 3200 K, 5600 K, and 8000 K. The light-controlling device according to this embodiment can preferably support a plurality of color temperatures as sources of incident light. The light-controlling device can more preferably support a plurality of color temperatures including a medium color temperature. For example, the light-controlling device can preferably support a medium color temperature and a low color temperature, a medium color temperature and a high color temperature, or a medium color temperature, a low color temperature, and a high color temperature. Herein, the phrase "the light-controlling device can support a source of incident light having a certain color temperature" means that when the light source is used, $CR_{Max} < CR_{MaxFP}$ can be achieved. When the light-controlling device can support incident light having a plurality of color temperatures, the range in which the light-controlling device is applied can be expanded. Specifically, the light-controlling device can exhibit high color reproducibility regardless of the color temperature of a source of incident light. For example, in the case of cameras, high color reproducibility can be exhibited without distinguishing the color temperature of a light source. Furthermore, it is desirable to faithfully reproduce various colors in order to improve the color reproducibility of the light-controlling device. Therefore, light obtained by reflecting the above-described light-source-emitting light at samples having various colors is preferably assumed to be light incident on the light-controlling device. Specifically, the color samples are, for example, a color checker (e.g., x-rite ColorChecker).

$CR_{Max}$

In the light-controlling device according to this embodiment, the color reproducibility is improved by giving a higher priority to reducing a change in the detection signal ratio in each of the plurality of detection light wavelength regions of the photodetector than to improving the spectral flatness. $CR_{Max}$ used to indicate the degree of a change in detection signal ratio will be described with reference to FIG. 1 that schematically illustrates an optical apparatus. The variable transmittance of a light-controlling device 1001 is referred to as $VT(\lambda)$. The transmission spectrum in the transmission state is referred to as $T_0(\lambda)$. The spectral sensitivity of a photodetector (RGB image pickup element) 1002 for RGB is referred to as $D_R(\lambda)$, $D_G(\lambda)$, and $D_B(\lambda)$. The signal strength obtained from the photodetector 1002 when incident light 1003 having a spectrum $I_0(\lambda)$ has entered the optical apparatus 1000 and has passed through the light-controlling device 1001 is referred to as $S_R$, $S_G$, and $S_B$. At this time, the signal strengths $S_{RT}$, $S_{GT}$, and $S_{BT}$ in the transmission state are expressed by the following formulae.

$$S_{RT} = \int_{\lambda_0}^{\lambda_1} I_0(\lambda) T_0(\lambda) D_R(\lambda) d\lambda$$

$$S_{GT} = \int_{\lambda_0}^{\lambda_1} I_0(\lambda) T_0(\lambda) D_G(\lambda) d\lambda$$

$$S_{BT} = \int_{\lambda_0}^{\lambda_1} I_0(\lambda) T_0(\lambda) D_B(\lambda) d\lambda \qquad (3)$$

Herein, $\lambda_0$ represents a lower-limit wavelength in the detection light wavelength regions of the photodetector, and $\lambda_1$ represents an upper-limit wavelength in the detection light wavelength regions of the photodetector. Similarly, the signal strengths $S_{RC}$, $S_{GC}$, and $S_{BC}$ of the light-controlling device (the variable transmittance from the transmission state is referred to as $VT(\lambda)$) in the light reduction state are expressed by the following formulae.

$$S_{RC} = \int_{\lambda_0}^{\lambda_1} I_0(\lambda) T_0(\lambda) VT(\lambda) D_R(\lambda) d\lambda$$

$$S_{GC} = \int_{\lambda_0}^{\lambda_1} I_0(\lambda) T_0(\lambda) VT(\lambda) D_G(\lambda) d\lambda$$

$$S_{BC} = \int_{\lambda_0}^{\lambda_1} I_0(\lambda) T_0(\lambda) VT(\lambda) D_B(\lambda) d\lambda \qquad (4)$$

The transmittance of the light-controlling device in the light reduction state is a transmittance obtained by multiplying the transmittance in the transmission state by the variable transmittance $VT(\lambda)$. The light-controlling device in the transmission state has a higher transmittance than the light-controlling device in the light reduction state. Typically, the light-controlling device in the transmission state has the highest transmittance. When the color reproducibility of a spectrum at the highest transmittance of the light-controlling device is low, the transmission state is preferably selected as long as the light-controlling device can be effectively used. The light reduction ratio between the transmission state and the light reduction state of the light-controlling device (the ratio of the amounts of light emitted after the same amount of light enters the light-controlling device (transmission state/light reduction state)) is desirably 8 (ND8) or more and more preferably 32 or more. There are two reasons for this.

1. Usefulness as Light-Controlling Device

If the light reduction ratio is 8 or less, the adjustable range of the light-controlling device is limited, and the range in which the light-controlling device is applied is strictly limited. When the light reduction ratio is 32 or more, the applicability of the light-controlling device is considerably expanded.

2. Higher Light Reduction Ratio Makes it Difficult to Achieve High Color Reproducibility The light-controlling device according to this embodiment that absorbs light by combining a plurality of compounds whose light absorption characteristics change is a light-absorbing device, and forms an absorbance (absorption) spectrum having a particular shape by combining the plurality of compounds. The shape of the absorbance spectrum basically (ideally) remains unchanged regardless of the concentration. On the other hand, the amount of light that enters an image pickup element or a human eye serving as a photodetector is determined by "amount of incident light× transmittance". Therefore, when the reproducibility is discussed for colors normalized by the amount of light, a normalized transmittance is used. Herein, since the relationship between absorbance Abs and transmittance T is expressed by $T=10^{-Abs}$, the influence of the variation in absorbance due to wavelength exponentially increases as the absorbance increases. Therefore, when the light reduction ratio is as small as 8 or less, the light reduction change of the light-controlling device exerts a relatively small influence on color reproducibility. On the other hand, when the light reduction ratio is 8 or more, the light reduction change of the light-controlling device exerts a large influence on color reproducibility, and the influence considerably increases when the light reduction ratio is 32 or more. By using a technique of the light-controlling device according to this embodiment, high color reproducibility can be imparted to the light-controlling device even in a region having such a high light reduction ratio.

At this time, the signal strength ratios $r_{RGT}$ and $r_{BGT}$ of the photodetector in the transmission state in each of the detection light wavelength regions relative to G of RGB are expressed by the following formulae.

$$r_{RGT} = \frac{S_{RT}}{S_{GT}} \quad r_{BGT} = \frac{S_{BT}}{S_{GT}} \tag{5}$$

Similarly, the signal strength ratios $r_{RGC}$ and $r_{BGC}$ of the photodetector in the light reduction state in each of the detection light wavelength regions are expressed by the following formulae.

$$r_{RGC} = \frac{S_{RC}}{S_{GC}} \quad r_{BGC} = \frac{S_{BC}}{S_{GC}} \tag{6}$$

$CR_{Max}$ used to indicate the degree of a change in detection signal ratio is a value having the largest change between the signal strength ratio in the transmission state and the signal strength ratio in the light reduction state (light reduction state/transmission state or transmission state/light reduction state). That is, the ratio having the maximum value among the four ratios below is $CR_{Max}$.

$$\frac{r_{RGC}}{r_{RGT}} \quad \frac{r_{RGT}}{r_{RGC}} \quad \frac{r_{BGT}}{r_{BGC}} \quad \frac{r_{BGT}}{r_{BGC}} \tag{7}$$

The minimum value of the wavelength flatness of a transmission spectrum obtained by combining light absorption characteristics change spectra of a plurality of compounds is referred to as $TF_{FP}$, and $CR_{Max}$ at $TF_{FP}$ is referred to as $CR_{MaxFP}$. The minimum value $TF_{FP}$ and the variable transmittance $VT_{FP}(\lambda)$ that gives $TF_{FP}$ can be determined by minimization calculation using light absorption characteristics change spectra of a plurality of compounds. $CR_{MaxFP}$ is calculated from the above formula using $VT_{FP}(\lambda)$. In the light-controlling device according to this embodiment, a higher priority is given to reducing a change in the detection signal ratio in each of the plurality of detection light wavelength regions of the photodetector than to improving the spectral flatness. Therefore, the wavelength flatness TF of the light-controlling device according to this embodiment satisfies $TF>TF_{FP}$ and $CR_{Max}<CR_{MaxFP}$.

Electrochromic Device EC Device

The light-controlling device according to this embodiment preferably absorbs light by combining a plurality of compounds whose light absorption characteristics change with an external stimulus. A light-controlling device containing an EC compound is most preferably used because both the light transmission state with a high transmittance and the light reduction state with a low transmittance can be achieved. Hereafter, a light-controlling device that uses an EC device will be described in detail.

The EC device is formed of an inorganic material or an organic material. An example of the former is tungsten oxide. When an organic material is used, there are a high-molecular-weight EC device or a low-molecular-weight EC device. An example of the former is an EC device formed of polythiophene. To produce a light-controlling device having high color reproducibility, the light absorption characteristics need to be precisely controlled. From this viewpoint, a low-molecular-weight EC device is preferably used. Specifically, the color reproducibility is preferably improved by selecting low-molecular-weight EC compounds having different light absorption wavelengths and combining the strong absorption and the weak absorption of the compounds.

A typical EC device has a structure in which an EC layer containing an EC compound is disposed in a space between two transparent conductive electrodes, at least one of which is a transparent electrode, that are disposed so as to face each other, and the periphery is sealed with a sealing member. By controlling the voltage between the electrodes, the state of the EC device can be changed from a transmission state to a light reduction state.

Electrode

The electrode is preferably made of a material that is stably present in an operating environment of the EC device and that quickly undergoes an oxidation-reduction reaction in response to the application of voltage from the outside. The material for the electrode may be, for example, a transparent conductive material, such as tin-doped indium oxide (ITO) or fluorine-doped tin oxide (FTO), or a metal. When at least one of the electrodes is a transparent electrode, light can be efficiently introduced from the outside of the EC device to cause an interaction with the EC compound in the EC layer. Consequently, the optical characteristics of the EC compound can be reflected to emitted light.

Sealing Member

The sealing member is preferably made of a chemically stable material that is not easily permeated with gas and liquid and does not inhibit the oxidation-reduction reaction of the EC compound. Examples of the material include inorganic materials such as glass frit, organic materials such as epoxy resin and acrylic resin, and metals. The sealing member may have a function of holding the distance between the two electrodes through, for example, addition of a spacer material. This can define the interelectrode distance and the optical path length. Examples of the spacer material include inorganic materials such as silica beads and glass fiber and organic materials such as polyimide, polytetrafluoroethylene, polydivinylbenzene, fluorine rubber, and epoxy resin.

Electrochromic Layer

The EC device is classified into a single-electrode EC device in which an electrochemical reaction proceeds at one electrode and a complementary EC device in which an electrochemical reaction proceeds at both electrodes. Either of the EC devices can be used as the light-controlling device according to this embodiment, but a complementary EC device is preferably used to increase the light reduction ratio between the transmission state and the light reduction state of the light-controlling device. A typical complementary EC device contains an anodic EC compound that changes from the transmission state to the light reduction state through an oxidation reaction and a cathodic EC compound that changes from the transmission state to the light reduction state through a reduction reaction. Among typical complementary EC devices, an EC device in which electrochemical reactions other than the electrochemical reaction of the EC compound are highly suppressed undergoes less color change in the light reduction state even when repeatedly operated, and thus is preferably used as the light-controlling device according to this embodiment.

In a complementary EC device in which electrochemical reactions other than the electrochemical reaction of the EC compound are highly suppressed, the charge used when a reaction of the anodic EC compound proceeds is substantially equal to the charge used when a reaction of the cathodic EC compound proceeds. Therefore, in such a complementary EC device, the variable transmittance $VT(\lambda)$ obtained by combining the light absorption characteristics changes of a plurality of compounds needs to be calculated while the light absorption characteristics change of the anodic EC compound and the light absorption characteristics change of the cathodic EC compound are distinguished. Specifically, calculation is performed such that the total charge concentration of the anodic EC compound in the light reduction state is substantially equal to the total charge concentration of the cathodic EC compound in the light reduction state. Herein, the charge concentration in the light reduction state refers to a charge required to yield the concentration of the EC compound in the light reduction state. The charge concentration can be expressed by $a \times b$, where a represents the number of electrons used in the reaction that changes the EC material in a transmission state to the EC material in a light reduction state and b represents the concentration of the EC compound in the light reduction state. The phrase "the total charge concentrations are substantially equal to each other" means that the difference between the total charge concentrations is within 10% and preferably within 5%.

As described above, in the complementary EC device, when the variable transmittance spectrum is obtained, the total charge concentration of the anodic EC compound in the light reduction state and the total charge concentration of the cathodic EC compound in the light reduction state are limited. As described in the <<Compound whose light absorption characteristics change with external stimulus>>, the plurality of compounds are preferably three or more compounds. In the complementary EC device, each of the anodic EC compound and the cathodic EC compound is preferably constituted by a plurality of compounds to ensure the flexibility of variable transmission spectra under the limitation of the charge concentration. This is because even under the limitation of the above-described charge concentration, the concentration ratio in the light reduction state can be freely set among anodic EC compounds and among cathodic EC compounds. This can considerably increase the effect of optimization by $CR_{Max}$ in the present invention.

The EC compound in the EC device may be dissolved in a solvent or the like to form an EC layer or may be immobilized on the electrode. When the EC compound is immobilized on the electrode, the concentration of the EC compound adsorbed can be increased by using a porous electrode, which can increase the light reduction ratio between the transmission state and the light reduction state. The thickness of the EC layer in this case is in the range in which the EC compound whose transmittance changes is present, and the concentration is an average concentration in the thickness of the EC layer.

The EC compound is a compound whose light absorption characteristics repeatedly change through an oxidation-reduction reaction in the light wavelength regions of the EC device. Some EC compounds have a relatively low changed absorption coefficient. Such compounds having a relatively low changed absorption coefficient also undergo a small change in light absorption characteristics and contributes to providing charges in the reaction. Therefore, when the above-described charge concentration is calculated, such compounds having a low changed absorption coefficient are also regarded as EC compounds.

Examples of the anodic EC compound include thiophene derivatives, amines having an aromatic ring (e.g., phenazine derivatives and triallylamine derivatives), pyrrole derivatives, thiazine derivatives, triallylmethane derivatives, bis(phenyl) methane derivatives, xanthene derivatives, fluoran derivatives, and spiropyran derivatives. Among them, the anodic EC compound is preferably low-molecular-weight amines having an aromatic ring and most preferably dihydrophenazine derivatives. This is because when such a compound is used as the EC compound, an EC device having a desired absorption spectrum is easily provided, and high durability for repeated use is achieved. In a neutral state (reductant), these compounds have an absorption peak in the ultraviolet range and no absorption peaks in the visible range, and thus have a transmission state with a high transmittance in the visible range. When these molecules change into radical cations (oxidants) through an oxidation reaction, the absorption peak shifts to the visible range to realize a light reduction state. The absorption wavelength of these molecules can be freely designed by increasing or decreasing the $\pi$ conjugation length or by changing the $\pi$ conjugated system through a change in a substituent. The term "low-molecular-weight" herein refers to a molecular weight of 2000 or less.

Non-limiting examples of the cathodic EC compound include pyridine derivatives such as viologen derivatives and quinone compounds. Among them, pyridine derivatives such as viologen derivatives are most preferably used. In the form of divalent cations (oxidants), these compounds typically have an absorption peak in the ultraviolet range and no absorption peaks in the visible range, and thus have a transmission state with a high transmittance in the visible range. When these molecules change into radical cations (reductants) through a reduction reaction, the absorption peak shifts to the visible range to realize a light reduction state. The absorption wavelength of these molecules can also be freely designed by increasing or decreasing the $\pi$ conjugation length or by changing the $\pi$ conjugated system through a change in a substituent. The term "low-molecular-weight" herein refers to a molecular weight of 2000 or less.

Evaluation Method of Color Reproducibility

A method for evaluating the color reproducibility of the light-controlling device according to this embodiment will be described below. This light-controlling device desirably has a color that does not change when the degree of light reduction is changed. Therefore, the difference in the color of light incident on the light-controlling device at the photodetector is evaluated between the transmission state and the light reduction state of the light-controlling device. Specifically, the brightness changes when the degree of light reduction of the light-controlling device is changed. Therefore, the brightness of the light-controlling device in the transmission state and the brightness of the light-controlling device in the light reduction state are made uniform, and then the difference in color is evaluated using color difference (CIEDE2000 ($\Delta E_{00}$)).

Figure 4:
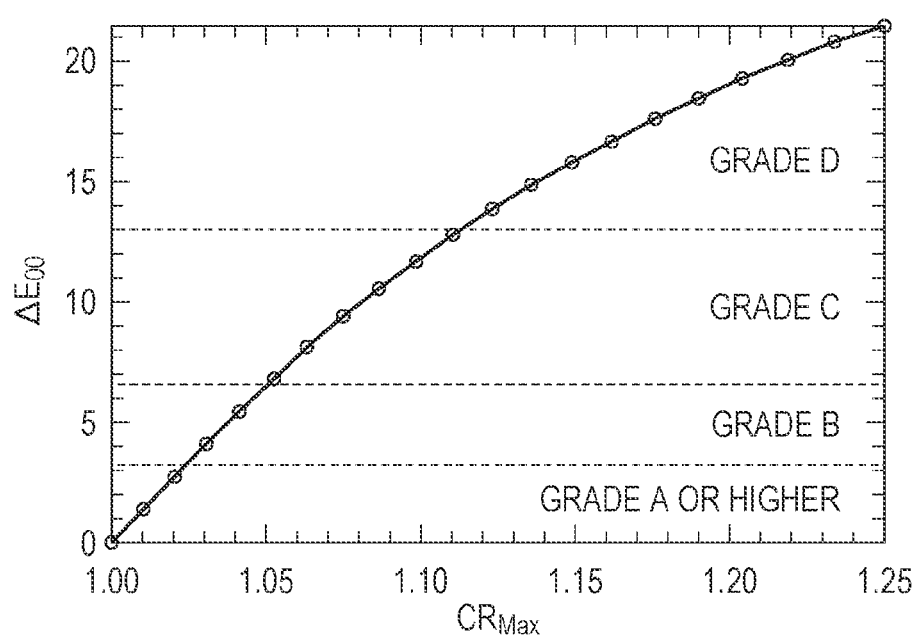
FIG. 4 illustrates the relationship between $CR_{Max}$ and $\Delta E_{00}$.

The color reproducibility increases as the color difference decreases, which will be described with reference to Tables of NIPPON DENSHOKU INDUSTRIES Co., Ltd. widely known as the index of color difference. The light-controlling device having high color reproducibility needs to have a color difference smaller than Grade C color tolerance ($\Delta E_{00}$: 6.5 to 13.0). The Grade C color tolerance refers to a color difference corresponding to one step in the JIS standard color chart, the Munsell color chart, or the like. Preferably, the color difference needs to be smaller than Grade B color difference ($\Delta E_{00}$: 3.2 to 6.5). The Grade B color tolerance refers to a color difference at which the colors are regarded as the same in terms of impression, but are sometimes regarded as different colors in the paint industry and the plastics industry, resulting in complaints. More preferably, the color difference needs to be smaller than Grade A color tolerance ($\Delta E_{00}$: 1.6 to 3.2). The Grade A color tolerance refers to a color difference at which when colors are separately compared with each other, the difference is substantially not recognized and the colors are considered to be the same in general. Improvement in color reproducibility of light-controlling device according to this embodiment Hereafter, an improvement in the color reproducibility of the light-controlling device according to this embodiment will be described. For example, FIG. 4 illustrates the simulation results of the relationship between $CR_{Max}$ and $\Delta E_{00}$ of a camera system having the spectral sensitivity illustrated in FIG. 2A using, as subjects, 24 patterns of a color checker with a light source that emits natural light in the daytime illustrated in FIG. 3A. This shows that by decreasing $CR_{Max}$, the change in color between the transmission state and the light reduction state of the light-controlling device (herein expressed as a color difference ($\Delta E_{00}$)) is decreased. In the light-controlling device according to this embodiment, the color reproducibility can be improved by giving a high priority to reducing a change ($CR_{Max}$) in the detection signal ratio in each of the plurality of detection light wavelength regions of the photodetector. It is also found that by satisfying $CR_{Max} \leq 1.11$, a color difference of $\Delta E_{00} \leq 13.0$, which is the Grade C color tolerance, can be achieved as the light-controlling device having high color reproducibility. Similarly, the Grade B color tolerance ($\Delta E_{00} \leq 6.5$) can be achieved by satisfying $CR_{Max} \leq 1.05$, and the Grade A color tolerance ($\Delta E_{00} \leq 3.2$) can be achieved by satisfying $CR_{Max} \leq 1.023$. Therefore, the range of $CR_{Max}$ of the light-controlling device according to this embodiment is preferably 1.11 or less, more preferably 1.05 or less, and further preferably 1.023 or less.

Advantageous Effect

According to the light-controlling device according to this embodiment, high color reproducibility can be achieved even in an optical apparatus including a light-controlling device containing a plurality of compounds such as a plurality of compounds whose light absorption characteristics change with an external stimulus. By giving a higher priority to reducing a change in the detection signal ratio in each of the plurality of detection light wavelength regions of the photodetector than to improving the spectral flatness, higher color reproducibility is achieved in this embodiment than in the case where the spectral flatness is improved.

Specifically, an optical apparatus below can be provided. The optical apparatus is, for example, a camera system in which the amount of light is adjusted with a variable ND filter and which undergoes less color change when the degree of light reduction of the variable ND filter is changed. The optical apparatus is also, for example, a transmittance-variable window and transmittance-variable glasses (sunglasses) that do not exhibit an unnatural color even when the amount of light is decreased. The optical apparatus is also, for example, a transmittance-variable mirror (antiglare mirror) that does not exhibit an unnatural color even when the reflectance is decreased.

Optical Filter, Lens Unit, Image Pickup Apparatus

The light-controlling device can be used for optical filters such as variable ND filters. An optical filter according to another embodiment of the present invention includes an EC device serving as the light-controlling device and an active element connected to the EC device. The active element is an element configured to adjust the amount of light that passes through the EC device. A specific example of the active element is a switching element for controlling the transmittance of the EC device. Examples of the switching element include TFTs and MIM elements. TFTs are also called thin film transistors and are made of a material such as a semiconductor or an oxide semiconductor. Specific examples of the material include semiconductors such as amorphous silicon, low-temperature polysilicon, and InGaZnO.

The EC device can be used for image pickup apparatuses and lens units. An image pickup apparatus according to another embodiment of the present invention includes the above-described optical filter including the EC device and an image pickup element 110 that serves as a photodetector and receives light which has passed through the optical filter.

A lens unit according to another embodiment of the present invention includes the above-described optical filter including the EC device and an image pickup optical system. The image pickup optical system is preferably a lens group including a plurality of lenses. The optical filter may be disposed such that light which has passed through the optical filter passes through the image pickup optical system, or may be disposed such that light which has passed through the image pickup optical system passes through the optical filter. The optical filter may be disposed between the plurality of lenses. The optical filter is preferably disposed along the optical axis of the lenses. The optical filter can adjust the amount of light that passes through or has passed through the image pickup optical system.

Figure 5A:
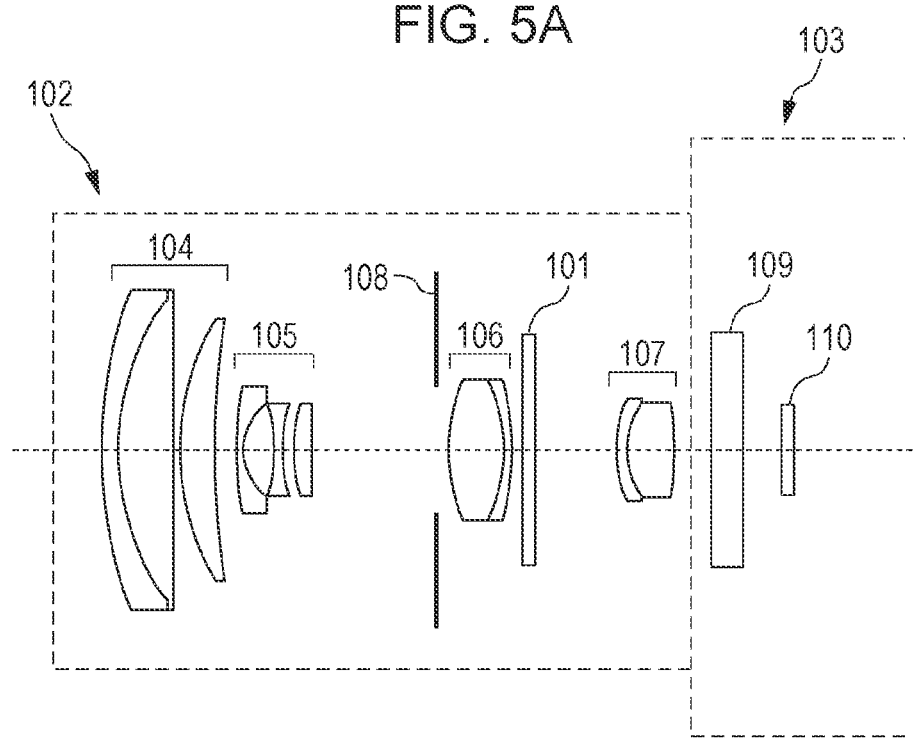
FIG. 5A schematically illustrates an example of an image pickup apparatus and a lens unit.
Figure 5B:
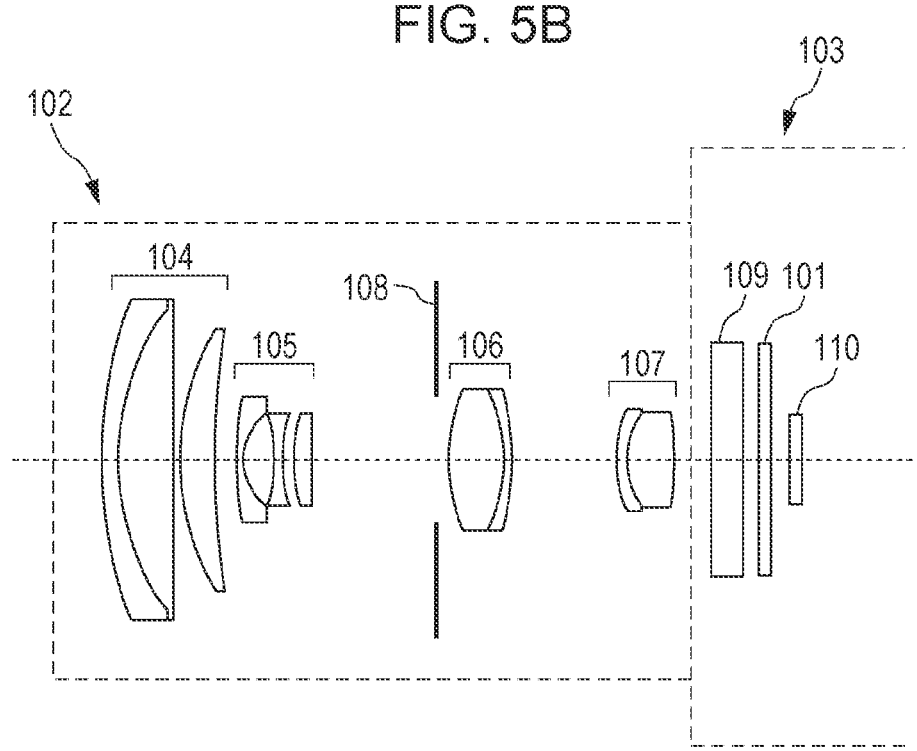
FIG. 5B schematically illustrates an example of an image pickup apparatus and a lens unit.

FIG. 5 schematically illustrates an example of the image pickup apparatus and lens unit including the optical filter. FIG. 5A illustrates an image pickup apparatus including a lens unit 102 including an optical filter 101. FIG. 5B illustrates an image pickup apparatus including an optical filter 101. As illustrated in FIG. 5A, the lens unit 102 is detachably connected to an image pickup unit 103 via a mount member (not illustrated).

The lens unit 102 is a unit including a plurality of lenses or a plurality of lens groups. For example, in FIG. 5A, the lens unit 102 is a rear-focusing zoom lens, and focusing is performed after the diaphragm. The lens unit 102 includes four lens groups constituted by a first lens group 104 having a positive refractive power, a second lens group 105 having a negative refractive power, a third lens group 106 having a positive refractive power, and a fourth lens group 107 having a positive refractive power in this order from the subject side (the left side of the drawing plane). The magnification is varied by changing the distance between the second lens group 105 and the third lens group 106, and focusing is performed by moving some lenses of the fourth lens group 107. The lens unit 102 includes, for example, an aperture stop 108 between the second lens group 105 and the third lens group 106 and the optical filter 101 between the third lens group 106 and the fourth lens group 107. Light passing through the lens unit 102 passes through the lens groups 104 to 107, the aperture stop 108, and the optical filter 101, and the amount of light can be adjusted using the aperture stop 108 and the optical filter 101.

The configuration in the lens unit 102 may be appropriately changed. For example, the optical filter 101 may be disposed in front of (on the subject side of) or behind (on the image pickup unit 103 side of) the aperture stop 108. Alternatively, the optical filter 101 may be disposed in front of the first lens group 104 or behind the fourth lens group 107. When the optical filter 101 is disposed at a position of convergence, the area of the optical filter 101 can be decreased. The structure of the lens unit 102 can also be appropriately selected. Instead of the rear-focusing system, an inner-focusing system in which focusing is performed before the diaphragm or another system may be employed. Instead of the zoom lens, a special lens such as a fisheye lens or a macro lens can also be appropriately selected.

The image pickup unit 103 includes a glass block 109 and an image pickup element 110. The glass block 109 is, for example, a low-pass filter, a face plate, or a color filter. The image pickup element 110 is a sensor that receives light which has passed through the lens unit 102 and may be, for example, a CCD or a CMOS. The image pickup element 110 may also be an optical sensor such as a photodiode, and an optical sensor that acquires and outputs information about light intensity or wavelength can be appropriately used.

As illustrated in FIG. 5A, when the optical filter 101 is incorporated in the lens unit 102, driving means such as an active element may be disposed in the lens unit 102 or outside the lens unit 102. When the driving means is disposed outside the lens unit 102, the EC device inside the lens unit 102 and the driving means outside the lens unit 102 are connected to each other through a wire to control driving.

As illustrated in FIG. 5B, the image pickup apparatus itself may include the optical filter 101. It is sufficient that the optical filter 101 is disposed at an appropriate position inside the image pickup unit 103 and the image pickup element 110 is disposed so as to receive light that has passed through the optical filter 101. In FIG. 5B, for example, the optical filter 101 is immediately in front of the image pickup element 110. When the image pickup apparatus itself includes the optical filter 101, the lens unit 102 itself connected to the image pickup apparatus does not necessarily include the optical filter 101. Thus, a light-controllable image pickup apparatus including a known lens unit can be provided.

Such an image pickup apparatus is applicable to products having light-amount adjustment and an image pickup element in a combined manner. For example, the image pickup apparatus can be used for cameras, digital cameras, video cameras, and digital video cameras and can also be applied to products including an image pickup apparatus, such as cellular phones, smartphones, PCs, and tablets.

By using the optical filter according to this embodiment as a light-controlling member, the amount of light controlled can be appropriately varied with a single filter, which advantageously reduces the number of members and saves the space.

According to the optical filter, the lens unit, and the image pickup apparatus of this embodiment, color unevenness due to a sealing material at the periphery of the EC device can be suppressed. This can suppress the deterioration of quality of an image obtained by capturing light transmitted through or reflected by the optical filter.

Window Member

Figure 6A:
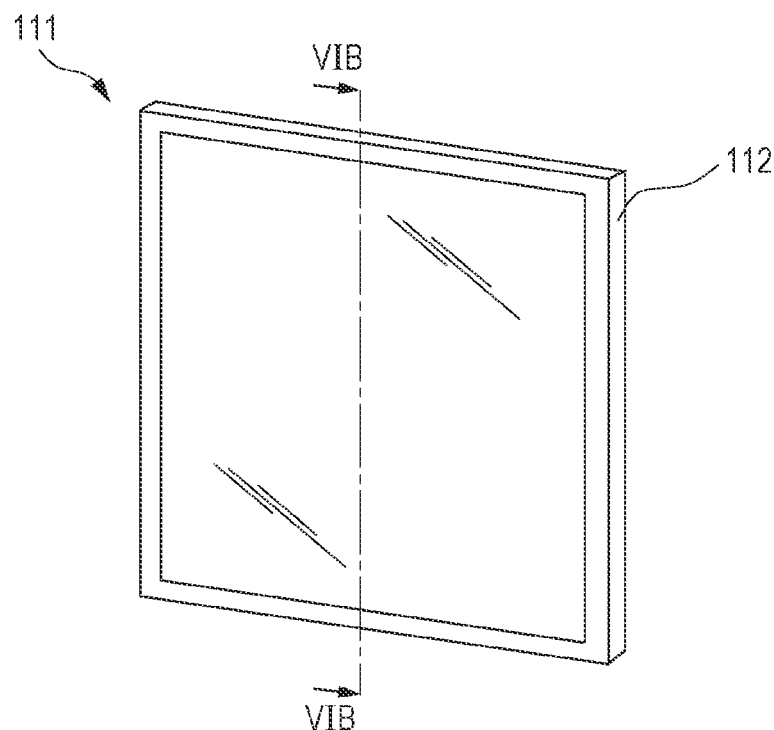
FIG. 6A schematically illustrates an example of a window member.
Figure 6B:
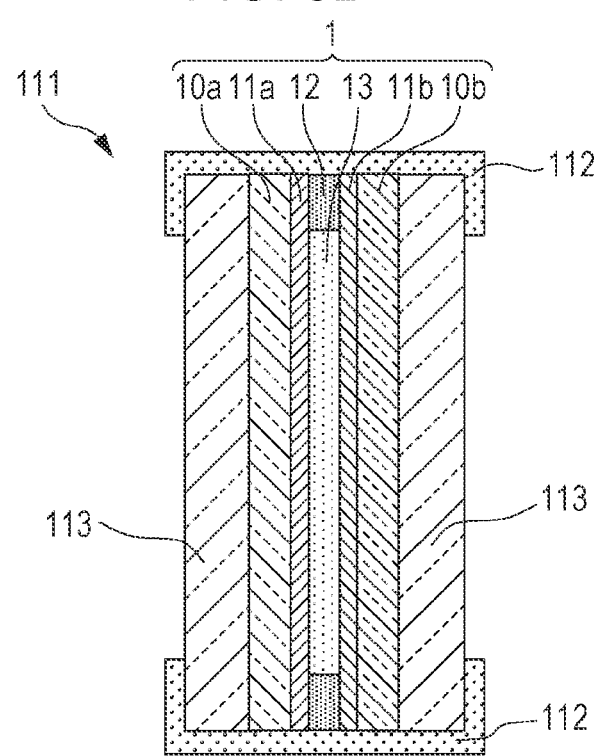
FIG. 6B schematically illustrates an example of a window member.

A window member according to another embodiment of the present invention includes the EC device 1 serving as a light-controlling device and an active element connected to the EC device. FIG. 6 schematically illustrates an example of the window member according to this embodiment. FIG. 6A is a perspective view and FIG. 6B is a sectional view taken along line VIB-VIB in FIG. 6A.

A window member 111 in FIG. 6 is a light-controlling window and includes the EC device 1, transparent sheets 113 (a pair of substrates) that sandwich the EC device 1, and a frame 112 that surrounds the entirety in an integrated manner. In the EC device 1, an EC layer 13 containing an EC compound is disposed between electrodes 11a and 11b formed on substrates 10a and 10b, and a sealing member 12 that holds the EC layer 13 is disposed so as to surround the outer periphery of the EC layer 13. The active element is an element for adjusting the amount of light passing through the EC device 1, and may be directly connected to the EC device 1 or may be indirectly connected to the EC device 1. The active element may be disposed inside the frame 112 in an integrated manner or may be disposed outside the frame 112 and connected to the EC device 1 through a wire.

The transparent sheets 113 may be made of any material having high light transmittance, and is preferably made of a glass material in consideration of use as a window. In FIG. 6, the EC device 1 is a constituent member independent of the transparent sheets 113. However, for example, the substrates 10 of the EC device 1 may be regarded as the transparent sheets 113.

The frame 112 may be made of any material, and all members that cover at least a part of the EC device 1 and have an integrated form may be regarded as a frame.

The light-controlling window may also referred to as a window member including an electronic curtain. The light-controlling window allows a sufficient amount of incident light to pass therethrough when the EC device 1 is in a transmission state and exhibits optical characteristics obtained by blocking and modulating incident light with certainty when the EC device 1 is in a light reduction state. For example, the window member according to this embodiment can be applied to adjustment of the amount of sunlight that enters a room in the daytime. The window member can also be applied to adjustment of the amount of heat as well as the amount of sunlight, and thus can be used for controlling the brightness and temperature in a room. The window member can also be used as a shutter for preventing view from the outdoors to a room. In addition to glass windows for buildings, the light-controlling window can be applied to windows for vehicles such as automobiles, trains, airplanes, and ships and filters of display surfaces of clocks and cellular phones.

Example

Hereafter, the optical apparatus according to the present invention will be described based on Examples. Specifically, an optical apparatus including a variable ND filter including a complementary EC device that absorbs light by combining a plurality of EC materials whose light absorption characteristics electrically change will be described as an example. Note that the present invention is not limited to Examples.

Anodic EC Compound

Specific examples of an anodic EC compound used in Examples will be shown below. Note that the EC compound used in the present invention is not limited to the examples.

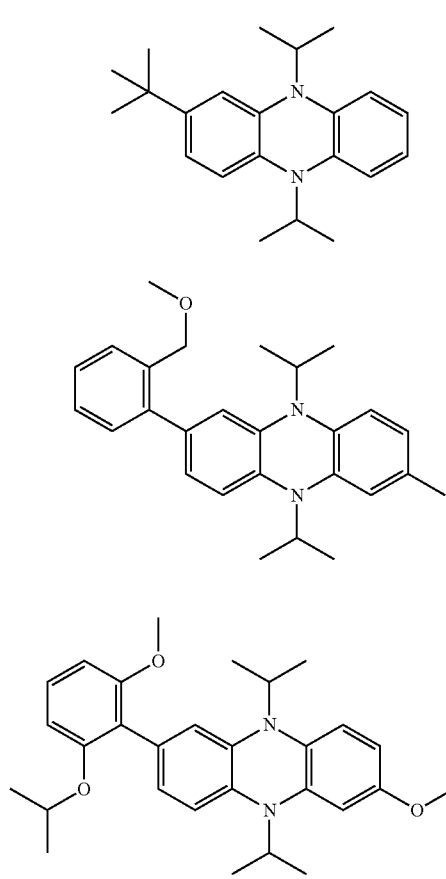

Preparation of Anodic EC Compound

The EC compounds (1) to (3) can be synthesized through a reaction represented by formula (A) below.

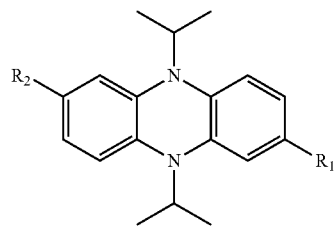

In the formula (A), $R_1$ represents a hydrogen atom, an alkyl group, or a phenoxy group, and Re represents an alkyl group or an aryl group. The EC compounds (1) to (3) can be synthesized by reducing a phenazine ring and performing isopropylation.

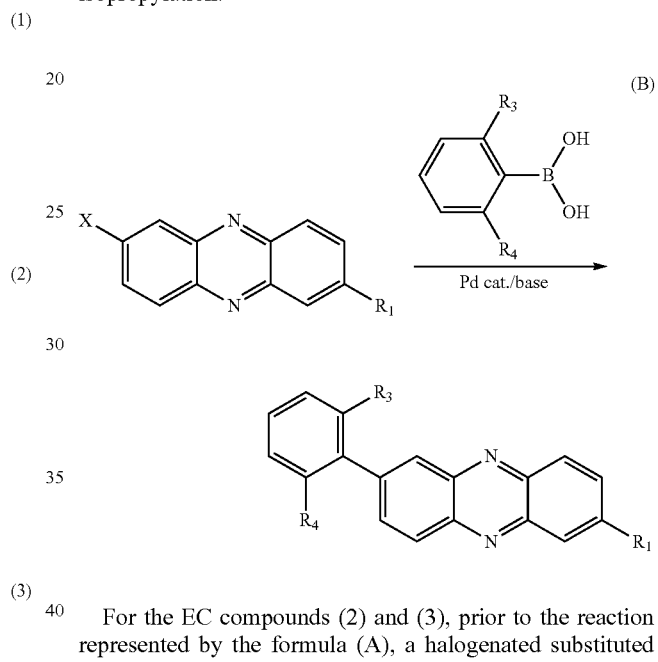

For the EC compounds (2) and (3), prior to the reaction represented by the formula (A), a halogenated substituted phenazine (X represents a halogen) and a phenylboronic acid or phenylboronic acid ester compound substituted with an alkyl group and an alkoxy group at ortho positions ($R_3$ and $R_4$), both of which are represented by formula (B), can be subjected to a coupling reaction using a publicly known Pd catalyst to synthesize a precursor.

For the EC compound (3), prior to the reactions represented by the formulae (A) and (B), a phenoxy group is introduced to a 7 position of a phenazine ring. The phenoxy group can be introduced to a halogenated phenazine through a coupling reaction with a publicly known Cu catalyst using phenol. The synthesis scheme of the EC compound (3) is represented by formula (C) below, with the specific examples of the reactions represented by the formulae (A) and (B) shown.

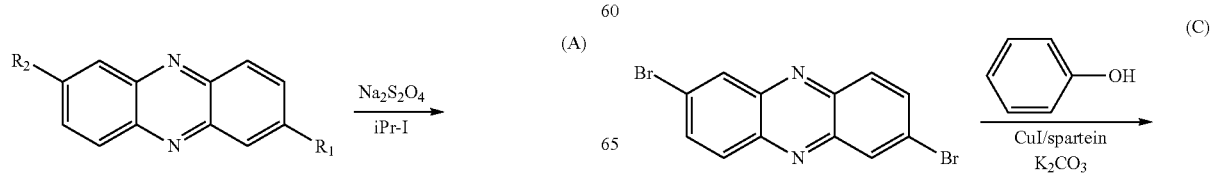

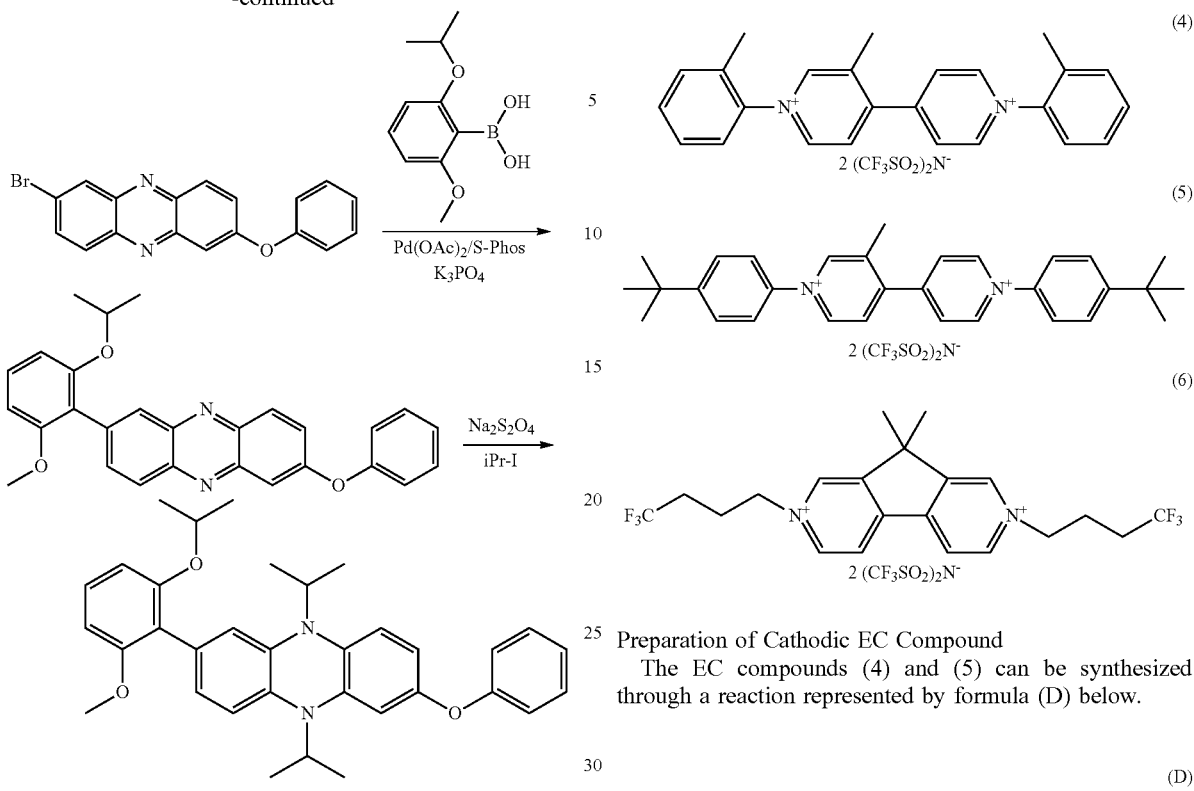

The EC compound (3) can be synthesized through, for example, the following procedure. First, a first intermediate is synthesized. 2,7-Dibromophenazine and phenol were mixed with each other in DMSO, and dissolved oxygen were removed using nitrogen. Then, a CuI/Spartein complex and potassium carbonate were added thereto and reflux was performed for 8 hours. The reaction solution was concentrated under reduced pressure and purified by silica gel chromatography to obtain a yellow solid first intermediate.

Subsequently, the first intermediate and 2-isopropoxy-6-methoxyphenylboronic acid were mixed with each other in a toluene/1,4-dioxane mixed solvent, and dissolved oxygen was removed using nitrogen. Pd(OAc)$_2$, 2-dicyclohexylphosphino-2',6'-dimethoxybiphenyl (S-Phos), and tripotassium phosphate were added thereto and reflux was performed for 15 hours. The reaction solution was concentrated under reduced pressure and separated and purified by silica gel chromatography to obtain a yellow solid second intermediate.

Subsequently, the second intermediate and 2-iodopropane were mixed with each other in an acetonitrile/water mixed solvent, and dissolved oxygen was removed using nitrogen. Sodium hydrosulfite and potassium carbonate were added thereto and reflux was performed for 10 hours. The reaction solution was concentrated under reduced pressure and separated and purified by silica gel chromatography to obtain a solid EC compound (3). $^1$H-NMR (hexadeuteroacetone) δ (ppm): 7.35 (m, 2H), 7.19 (t, 1H), 7.06 (t, 1H), 6.99 (d, 2H), 6.8-6.65 (m, 6H), 6.49 (d, 1H), 6.42 (dd, 1H), 4.47 (sep, 1H), 4.17 (sep, 1H), 3.97 (sep, 1H), 3.71 (s, 3H), 1.51 (d, 6H), 1.46 (d, 6H), 1.18 (d, 6H).

Cathodic EC Compound

Specific examples of the cathodic EC compound used in Examples are shown below. Note that the EC compound used in the present invention is not limited thereto.

Preparation of Cathodic EC Compound

The EC compounds (4) and (5) can be synthesized through a reaction represented by formula (D) below.

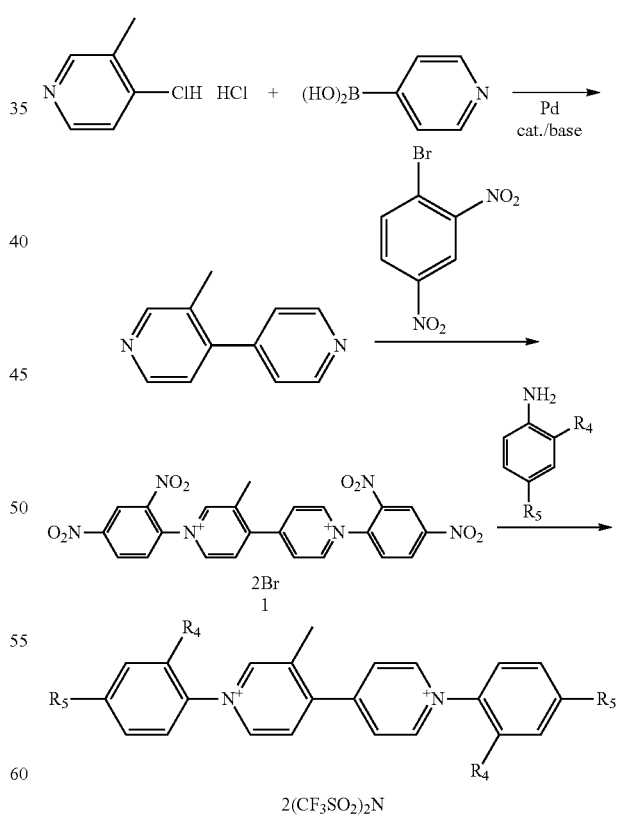

In the formula (D), $R_4$ represents a hydrogen atom or a methyl group and $R_5$ represents a hydrogen atom or a tert-butyl group. A specific example of the method for synthesizing the EC compound (4) will be described.

The first reaction was performed by refluxing, in a reaction vessel, 3-methyl-4-chloropyridine hydrochloride, 4-pyridylboronic acid, tris(dibenzylideneacetone) dipalladium (0), tricyclohexylphosphine, and tripotassium phosphate using a dioxane/water solvent in a nitrogen stream under heating for 8 hours. The reaction liquid was concentrated, then extracted with ethyl acetate, and purified by silica gel column chromatography and recrystallization to obtain 3-methyl-4,4'-bipyridine.

The second reaction was performed by reacting the 3-methyl-4,4'-bipyridine and 2,4-dinitrobromobenzene in an N, N-dimethylformamide solvent at 100° C. for 24 hours. The precipitated crystal was filtered and washed with acetonitrile to obtain an intermediate 1.

The third reaction was performed by refluxing the intermediate 1 and o-toluidine using an ethanol solvent for 8 hours. After removal of the solvent, ethyl acetate was added and the resulting precipitate was filtered. The obtained crystal was dissolved in water. An aqueous solution in which bis(trifluoromethanesulfonyl)imidolithium was dissolved was added dropwise thereto. After the resulting mixture was stirred at room temperature for 3 hours, isopropyl alcohol was further added and recrystallization was performed to obtain an EC compound (4).

$^1$H-NMR (CD$_3$CN) σ (ppm): 9.00 (d, 2H), 8.89 (s, 1H), 8.83 (d, 1H), 8.33 (d, 2H), 8.12 (d, 1H), 7.76-7.66 (m, 2H), 7.64-7.51 (m, 6H), 2.57 (s, 3H), 2.27 (s, 3H), 2.25 (s, 3H).

The EC compounds (6) and (7) can be synthesized by a reaction represented by formula (E) below.

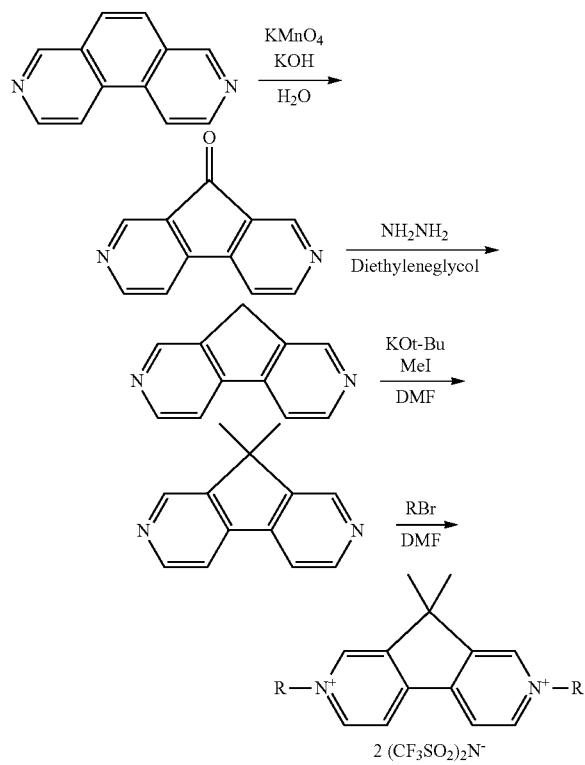

In the formula (E), R represents an alkyl group or a substituted alkyl group. A specific example of the method for synthesizing the EC compound (6) will be described.

First, a method for synthesizing 9,9-dimethyl-2,7-diazafluorene serving as an intermediate will be described. The synthesis was performed with reference to a technical document (E. Botana, et al., Angew. Chem. Int. Ed. 46, 198-201 (2007)). 3,8-Phenanthroline, potassium hydroxide, and water were charged into a reaction vessel and heated at 90° C. Then, water and potassium permanganate were mixed with each other. The resulting mixture heated to 90° C. was added dropwise to the reaction solution. A solid precipitated after the reaction was caused to proceed for 1 hour was filtered, extracted with chloroform, washed with water and a saturated saline solution, dried, and concentrated to obtain a brown powder. The brown powder was separated and purified by silica gel chromatography to obtain a yellow solid first intermediate.

The first intermediate, diethylene glycol, and hydrazine monohydrate were charged into a reaction vessel and reacted at 100° C. for 12 hours. The obtained dark red suspension to which water was added was extracted with dichloromethane, washed with water and a saturated saline solution, dried, and concentrated to obtain a dark yellow solid. The dark yellow solid was separated and purified by silica gel chromatography to obtain a yellowish brown solid second intermediate.

The second intermediate and DMF were charged into a reaction vessel and cooled in an ice bath. Then, potassium tert-butoxide was added thereto and stirred at the same temperature for 30 minutes, and iodomethane diluted with DMF was added dropwise thereto. After stirring was further performed at the same temperature for 30 minutes, the reaction was caused to proceed at room temperature for 3 hours. The obtained reddish brown suspension was added to a saturated sodium bicarbonate solution, extracted with ethyl acetate, washed with water and a saturated saline solution, dried, and concentrated to obtain a dark yellow solid. The dark yellow solid was separated and purified by silica gel chromatography to obtain a beige solid 9,9-dimethyl-2,7-diazafluorene.

The 9,9-dimethyl-2,7-diazafluorene and an excess amount of 4,4',4''-trifluorobromobutane were charged into a reaction vessel and reacted using DMF as a solvent at 110° C. for 19 hours. The precipitate was collected and dissolved in water, and an excess amount of bis(trifluoromethanesulfonyl)imidolithium was added thereto. The precipitate was filtered for collection and dried to obtain an EC compound (6).

Production of EC Device

Two transparent conductive glasses on which an indium-doped tin oxide (ITO) film was formed were disposed such that the ITO films faced each other. The outer peripheries of the two transparent conductive glasses were bonded using a sealing member to which spacer beads having a particle size of 50 μm were added. A solution containing an anodic EC compound and a cathodic EC compound dissolved therein was injected through an injection port formed in the transparent conductive glasses in advance. Thus, a space defined by the two transparent conductive glasses and the sealing member was filled with the solution. Subsequently, the injection port was sealed with a sealing material to produce an EC device.

Evaluation of Changed Absorption Coefficient Δελ of EC Compound

First, a changed absorbance (a value calculated by subtracting the absorbance in a transmission state of an EC compound from the absorbance in a light reduction state of the EC compound) spectrum of the EC compound alone was obtained. The EC compound was dissolved in a propylene carbonate solution of 0.1 mol/L tetrabutylammonium hexafluorophosphate so as to have a concentration of 1 mmol/L. A platinum mesh electrode was used as a working electrode, a platinum wire electrode was used as a counter electrode, and a Ag/Ag$^+$ electrode was used as a reference electrode. A potential at which the EC compound was in a light reduction state was applied in a cuvette having an optical path length of 1 mm for 120 seconds to obtain a changed absorbance spectrum.

Subsequently, one anodic EC compound and one cathodic EC compound were dissolved in propylene carbonate so as to each have a concentration of 0.05 mol/L, and an EC device was produced using the solution. In a complementary EC device in which electrochemical reactions other than the electrochemical reaction of the EC compound are highly suppressed, the amount of charge used to produce a light reduction state of the anodic EC compound is equal to that of the cathodic EC compound. Based on the above, the changed absorption coefficient of an EC compound having an opposite polarity was determined by using the changed absorption coefficient of a reference compound. The reference compound used herein was 5,10-diisopropyl-5,10-dihydrophenazine ($\Delta\varepsilon$(480 nm)=6.5×10$^3$ mol$^{-1}$Lcm$^{-1}$).

Figure 7:
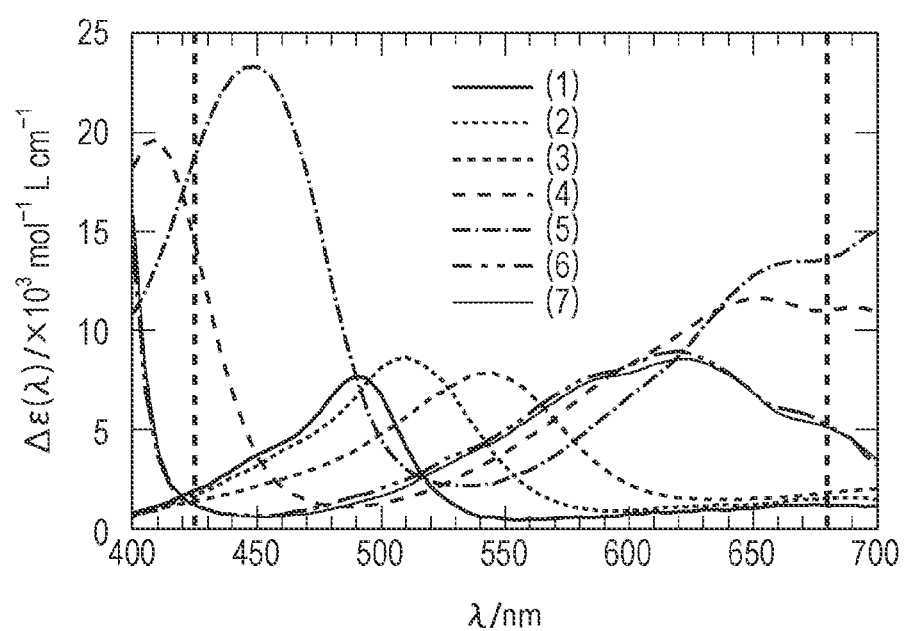
FIG. 7 illustrates changed absorbance spectra of EC compounds in Example.

FIG. 7 illustrates the spectra of changed absorption coefficients $\Delta\varepsilon(\lambda)$ of the EC compounds (1) to (6). Since the complementary EC device is used in Examples, the changed absorption coefficient $\Delta\varepsilon(\lambda)$ is determined and then the variable transmittance VT($\lambda$) is calculated. However, the variable transmittance VT($\lambda$) or the wavelength flatness TF can also be directly calculated from the changed absorbance (without determining $\Delta\varepsilon(\lambda)$).

Combination 1 of EC Compounds

Constitution of Variable Transmittance VT($\lambda$)

The variable transmittance VT($\lambda$) is constituted by using the $\Delta\varepsilon(\lambda)$ spectra of the EC compounds (1) to (6) illustrated in FIG. 7. The three EC compounds (1) to (3) are anodic compounds and the three EC compounds (4) to (6) are cathodic compounds. The total number of EC compounds used is six. The detection light wavelength region of the photodetector was a region of 425 nm or more and 680 nm or less of the photodetector in FIG. 2. The EC compounds (4) to (6) have a peak of the variable absorption spectrum in an R region of the photodetector, the EC compounds (2) and (3) have a peak of the variable absorption spectrum in a G region of the photodetector, and the EC compounds (1) and (5) have a peak of the variable absorption spectrum in a B region of the photodetector. The light reduction ratio between the transmission state and the light reduction state of the variable ND filter was set to 64 (=average variable transmittance 1.56%).

Figure 8A:
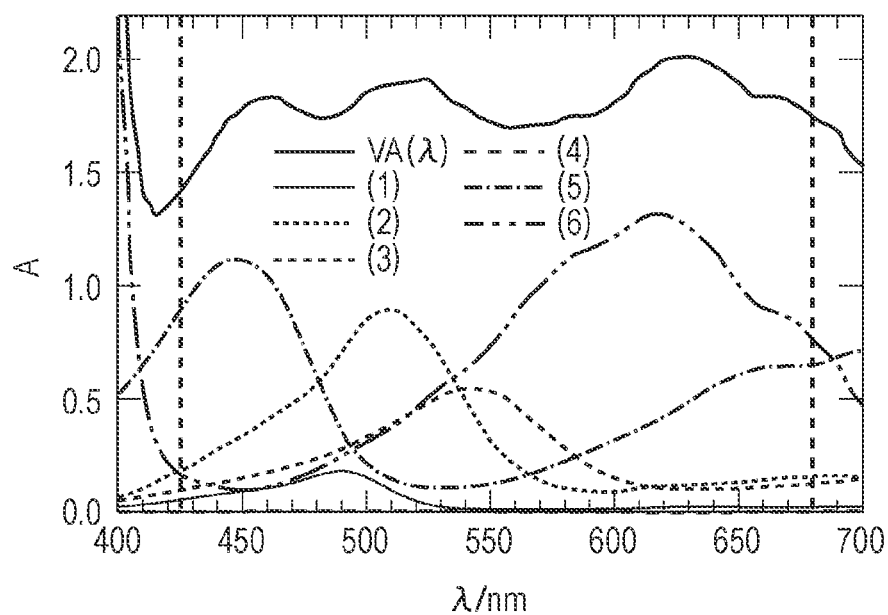
FIG. 8A illustrates spectra optimized by giving a high priority to $CR_{Max}$.
Figure 8B:
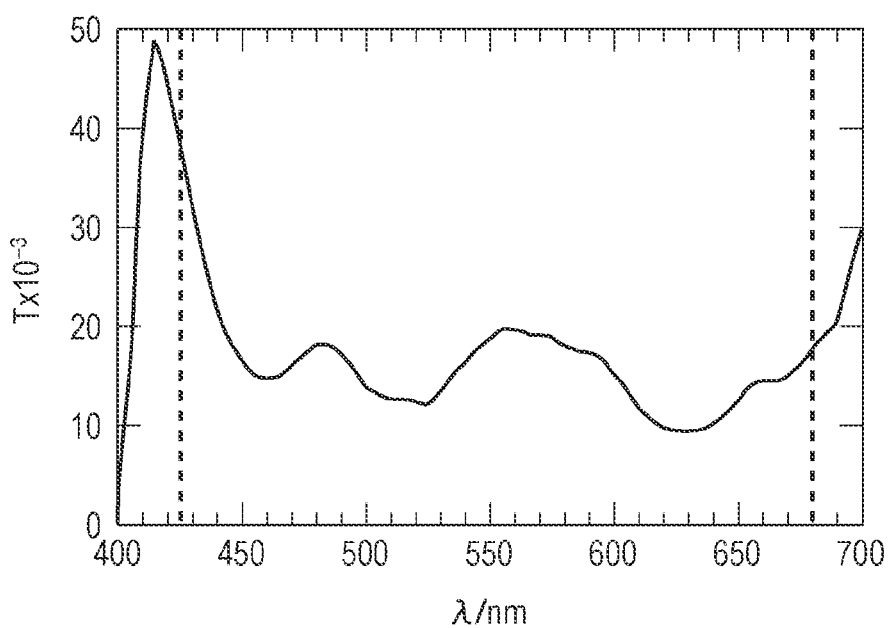
FIG. 8B illustrates a spectrum optimized by giving a high priority to $CR_{Max}$.

(A) Variable Transmittance VT($\lambda$) Obtained by Giving Higher Priority to Reducing Change in Detection Signal Ratio (CR$_{Max}$) than to Improving Spectral Flatness FIG. 8 illustrates a spectrum optimized by combining $\Delta\varepsilon(\lambda)$ of the plurality of EC compounds (1) to (6) such that CR$_{Max}$ is decreased for various light sources illustrated in FIG. 3. FIG. 8A illustrates a variable absorbance spectrum VA($\lambda$) obtained by combining the absorbances of the EC compounds (1) to (6). FIG. 8B illustrates a variable transmittance VT($\lambda$) obtained by converting VA($\lambda$) to a transmittance. Herein, the wavelength flatness TF in the detection light wavelength regions is 178%, and CR$_{Max}$ calculated using the spectrum of natural light in the daytime in FIG. 3A is 1.09. Table 1 shows the concentrations (unit: mmolL$^{-1}$) of the plurality of EC compounds (1) to (6) in the light reduction state.

TABLE 1

| | Anodic EC compound | | | | Cathodic EC compound | | | |
|---|---|---|---|---|---|---|---|---|
| | (1) | (2) | (3) | Total | (4) | (5) | (6) | Total |
| Concentration in light reduction state [mmolL$^{-1}$] | 8.0 | 34.6 | 23.3 | 65.9 | 0.7 | 15.9 | 49.3 | 65.9 |

Table 1 shows that the total charge concentration of the anodic EC compounds in the light reduction state is substantially equal to the total charge concentration of the cathodic EC compounds in the light reduction state.

Figure 9A:
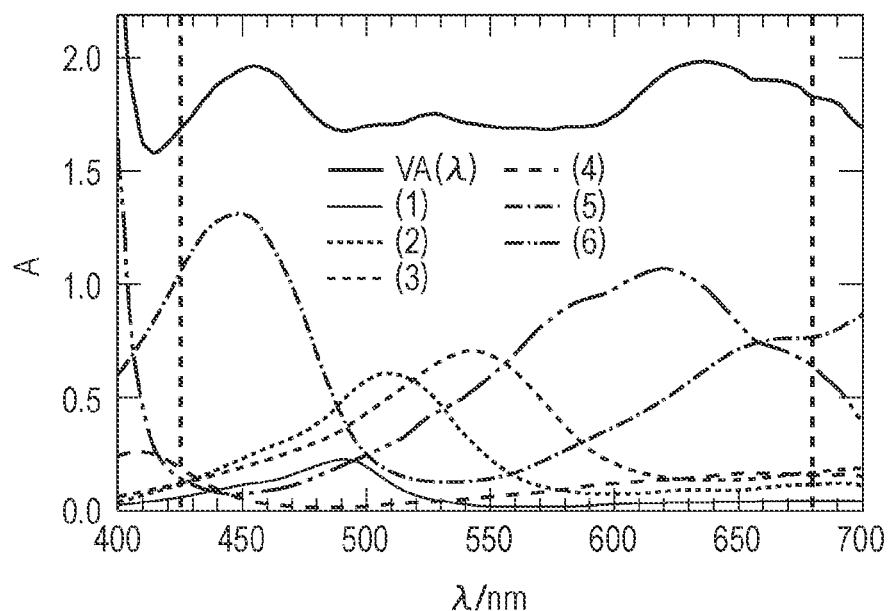
FIG. 9A illustrates spectra optimized by giving a high priority to wavelength flatness.
Figure 9B:
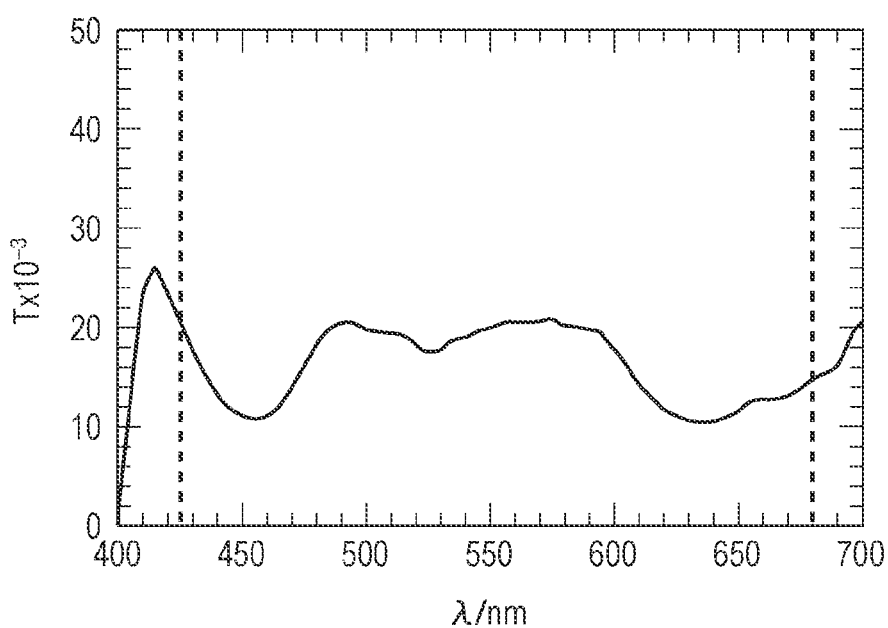
FIG. 9B illustrates a spectrum optimized by giving a high priority to wavelength flatness.

(B) Variable Transmittance VT$_{FP}(\lambda)$ Obtained by Giving High Priority to Spectral Flatness FIG. 9 illustrates a spectrum obtained by combining $\Delta\varepsilon(\lambda)$ of the plurality of EC compounds (1) to (6) such that the wavelength flatness of the variable transmittance is minimized by minimization calculation. FIG. 9A illustrates a variable absorbance spectrum VA($\lambda$) obtained by combining the absorbances of the EC compounds (1) to (6). FIG. 9B illustrates a variable transmittance VT$_{FP}(\lambda)$ at which the flatness is minimized. The wavelength flatness TF in the detection light wavelength regions is 65.4%, which is the highest wavelength flatness TF$_{FP}$ in the combination of the compounds. CR$_{MaxFP}$ calculated using the spectrum of natural light in the daytime in FIG. 3A is 1.15. Table below shows the concentrations (unit: mmolL$^{-1}$) of the plurality of EC compounds (1) to (6) in the light reduction state.

TABLE 2

| | Anodic EC compound | | | | Cathodic EC compound | | | |
|---|---|---|---|---|---|---|---|---|
| | (1) | (2) | (3) | Total | (4) | (5) | (6) | Total |
| Concentration in light reduction state [mmolL$^{-1}$] | 9.6 | 23.6 | 29.9 | 63.1 | 4.5 | 18.7 | 39.9 | 63.1 |

Table 2 shows that the total charge concentration of the anodic EC compounds in the light reduction state is substantially equal to the total charge concentration of the cathodic EC compounds in the light reduction state.

Evaluation

Figure 10A:
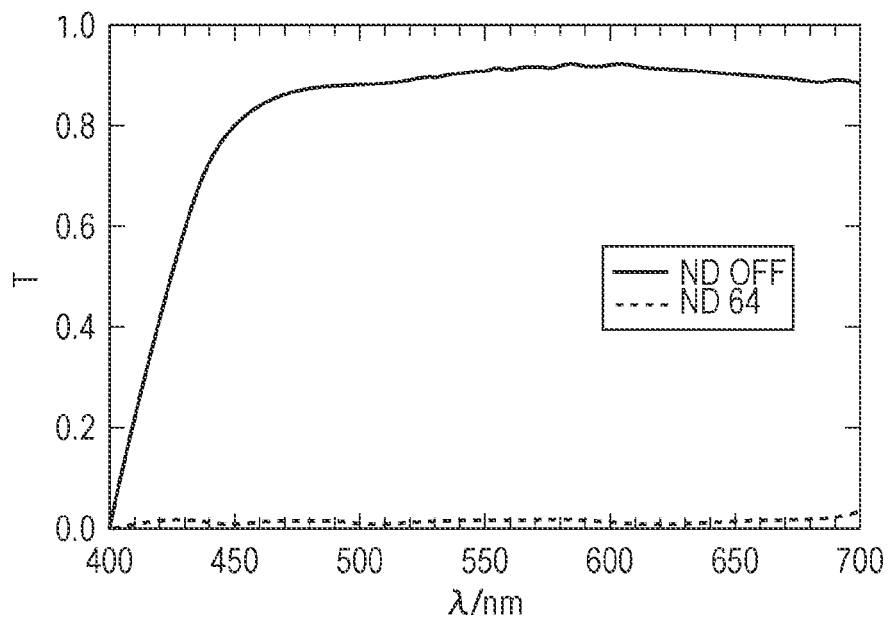
FIG. 10A illustrates a spectral change of an ND filter optimized by giving a high priority to $CR_{Max}$ and a color change through the ND filter.
Figure 10B:
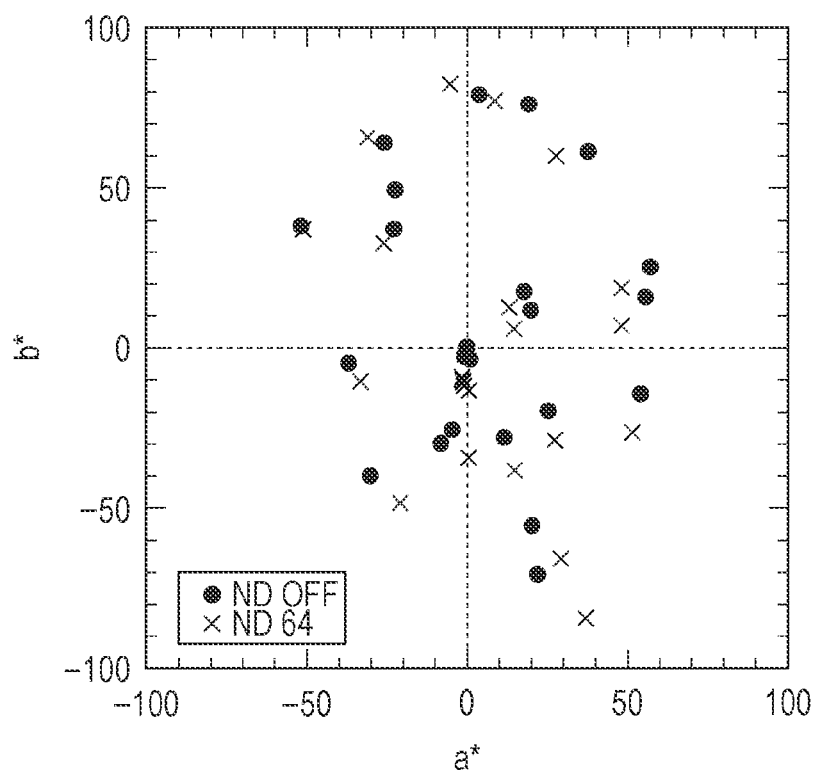
FIG. 10B illustrates a spectral change of an ND filter optimized by giving a high priority to $CR_{Max}$ and a color change through the ND filter.

FIG. 10A illustrates transmission spectra in a transmission state (ND OFF) and a light reduction state (ND64) of an ND filter having "(A) Variable transmittance VT($\lambda$) obtained by giving higher priority to reducing change in detection signal ratio (CR$_{Max}$) than to improving spectral flatness". FIG. 10B illustrates colors plotted on the a*b* plane of the L*a*b* space, the colors being obtained by capturing, as subjects, 24 patterns of a color checker using the transmission spectra in FIG. 10A, the spectrum of natural light in the daytime in FIG. 3A, and the spectral sensitivity in FIG. 2A. In this drawing, the color reproducibility increases as the distance between the plots in the transmission state of the ND filter and the plots in the light reduction state of the ND filter decreases.

Figure 11A:
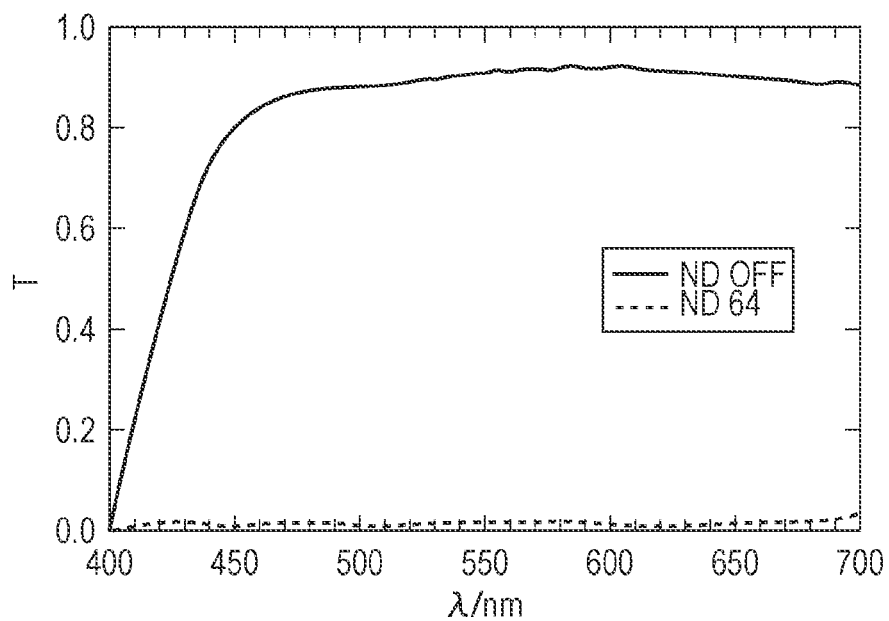
FIG. 11A illustrates a spectral change of an ND filter optimized by giving a high priority to wavelength flatness and a color change through the ND filter.
Figure 11B:
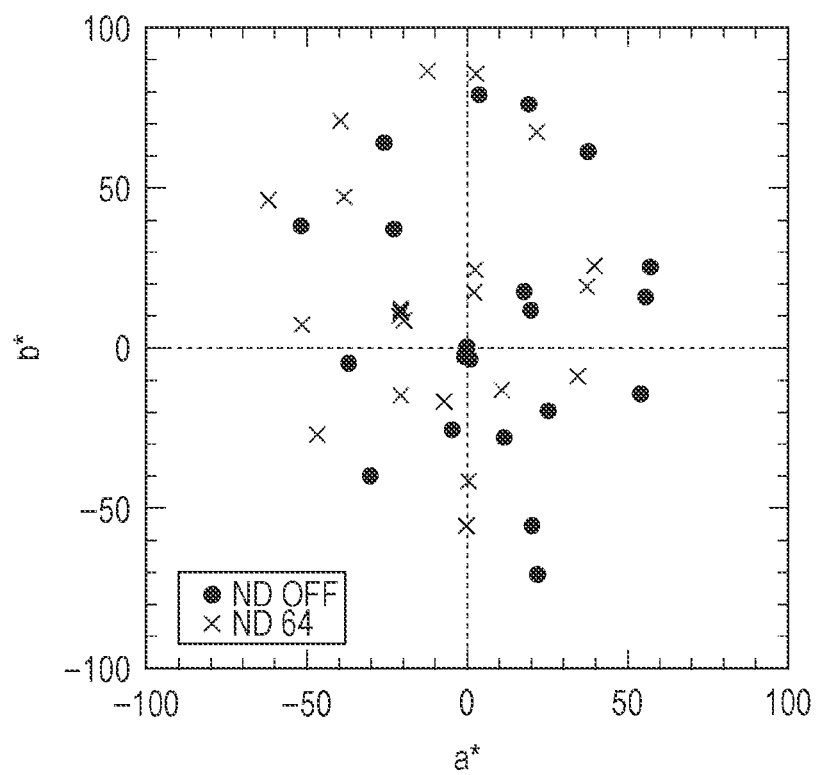
FIG. 11B illustrates a spectral change of an ND filter optimized by giving a high priority to wavelength flatness and a color change through the ND filter.

FIG. 11A illustrates transmission spectra in a transmission state (ND OFF) and a light reduction state (ND64) of an ND filter having "(B) Variable transmittance VT$_{FP}(\lambda)$ obtained by giving high priority to spectral flatness". FIG. 11B illustrates 25 colors plotted on the a*b* plane of the L*a*b* space, the 25 colors being obtained by capturing, as subjects, 24 patterns of a color checker and a light source itself using the transmission spectra in FIG. 11A, the spectrum of natural light in the daytime in FIG. 3A, and the spectral sensitivity in FIG. 2A.

The comparison between FIG. 10B and FIG. 11B shows that the ND filter having a high priority to $CR_{Max}$ in FIG. 10B has higher color reproducibility than the ND filter having a high priority to spectral flatness in FIG. 11B. When expressed numerically, the maximum value of the color difference ($\Delta E_{00}$) of the 25 colors was 9.9 in FIG. 10B and 21.8 in FIG. 11B. This showed that even when the same compounds were combined with each other, the color reproducibility was two or more times higher in the case where a high priority was given to $CR_{Max}$ as in the present invention than in the case where a high priority was given to spectral flatness.

Combination 2 of EC compounds

Constitution of Variable Transmittance VT(λ)

The variable transmittance VT(λ) is constituted by using the Δε(λ) spectra of the EC compounds (1) to (5) and (7) illustrated in FIG. 7. The three EC compounds (1) to (3) are anodic compounds and the three EC compounds (4), (5), and (7) are cathodic compounds. The total number of EC compounds used is six. The detection light wavelength region of the photodetector was a region of 425 nm or more and 680 nm or less of the photodetector in FIG. 2. The EC compounds (4), (5), and (7) have a peak of the variable absorption spectrum in an R region of the photodetector, the EC compounds (2) and (3) have a peak of the variable absorption spectrum in a G region of the photodetector, and the EC compounds (1) and (5) have a peak of the variable absorption spectrum in a B region of the photodetector. The light reduction ratio between the transmission state and the light reduction state of the variable ND filter was set to 64 (=average variable transmittance 1.56%).

Figure 12:
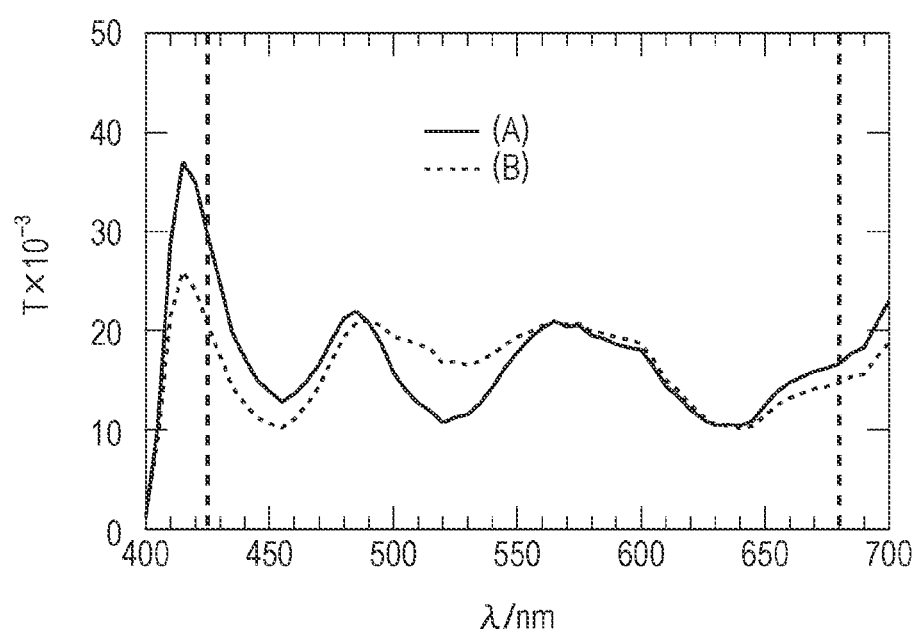
FIG. 12 illustrates transmission spectra of ND filters optimized by giving a high priority to wavelength flatness and CRMax.
Figure 13A:
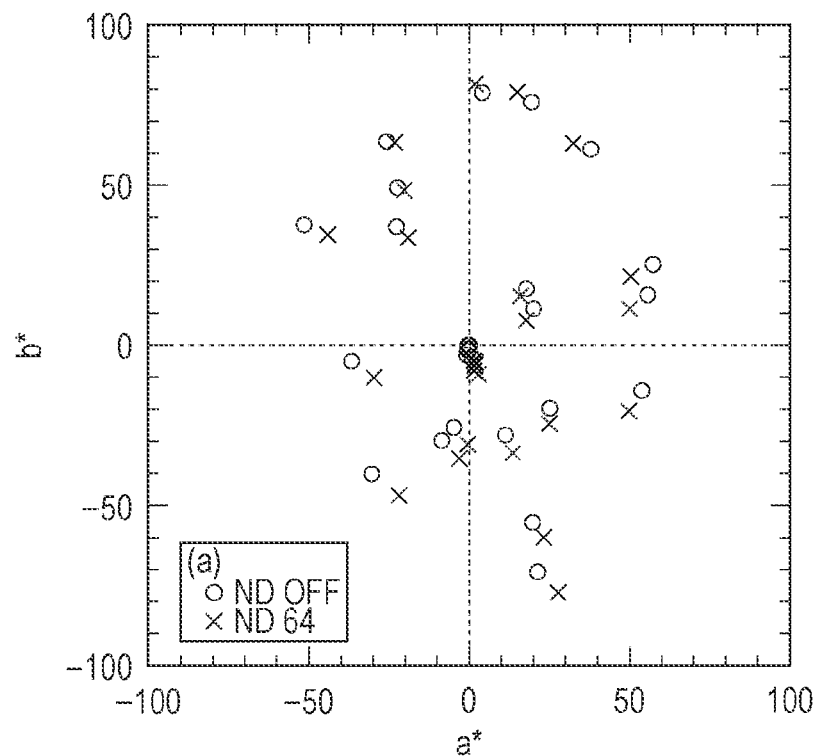
FIG. 13A illustrates a color change through an ND filter optimized by giving a high priority to CRMax.
Figure 13B:
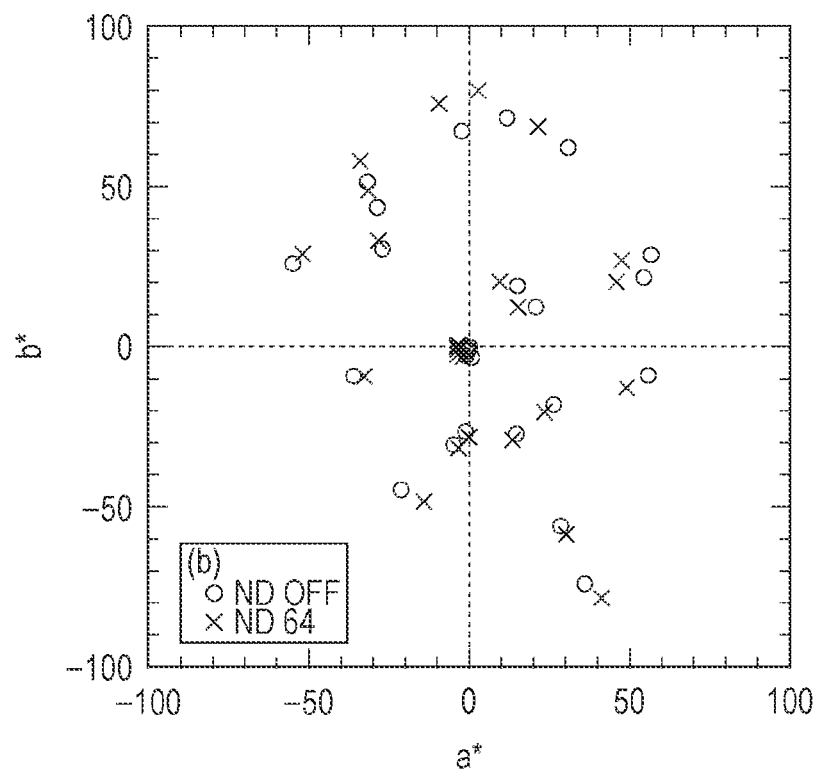
FIG. 13B illustrates a color change through an ND filter optimized by giving a high priority to CRMax.
Figure 13C:
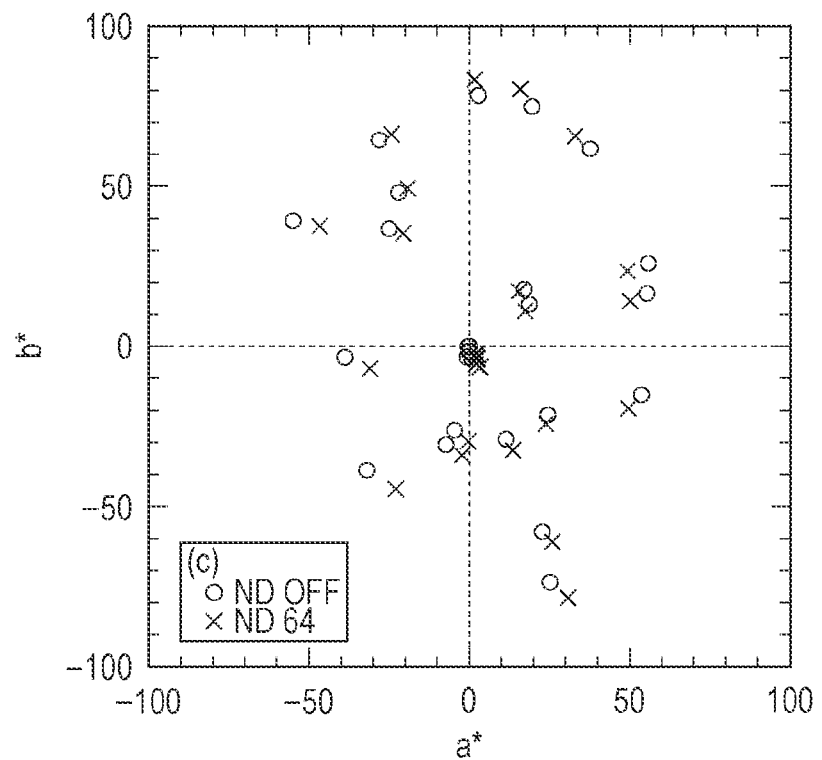
FIG. 13C illustrates a color change through an ND filter optimized by giving a high priority to CRMax.
Figure 13D:
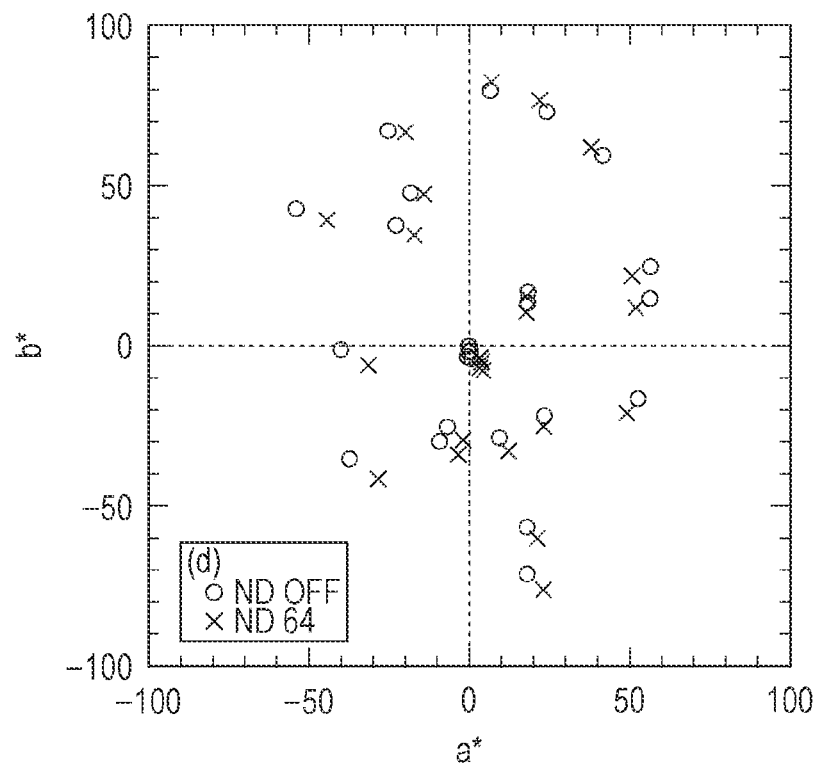
FIG. 13D illustrates a color change through an ND filter optimized by giving a high priority to CRMax.
Figure 14A:
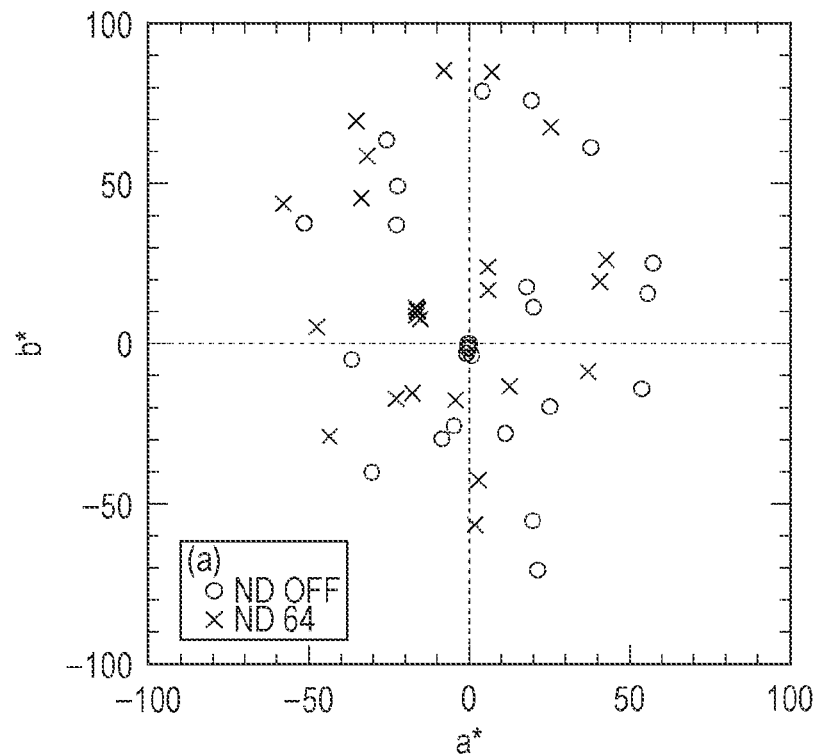
FIG. 14A illustrates a color change through an ND filter optimized by giving a high priority to wavelength flatness.
Figure 14B:
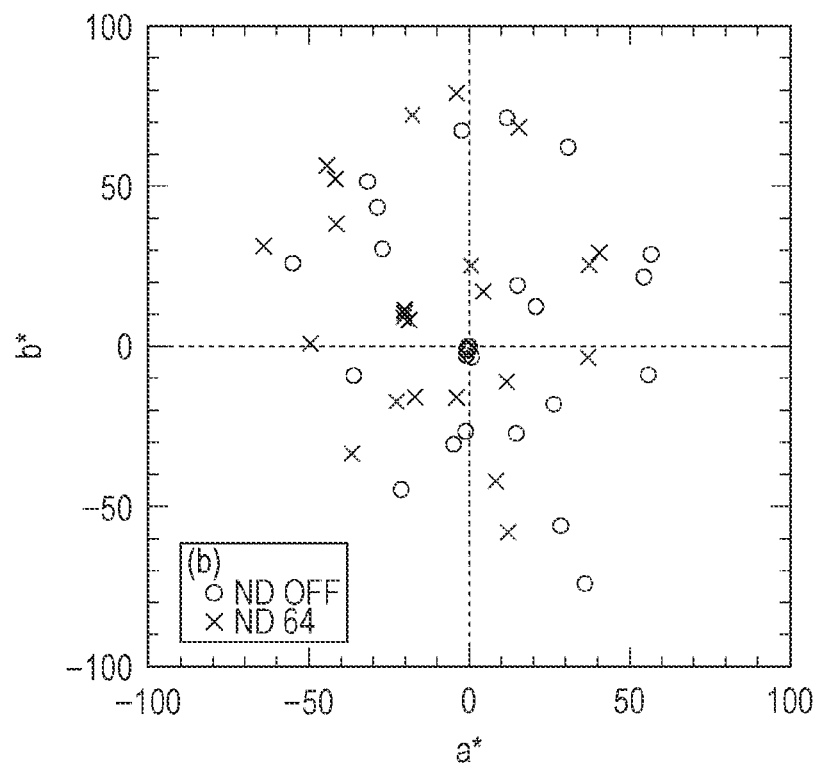
FIG. 14B illustrates a color change through an ND filter optimized by giving a high priority to wavelength flatness.
Figure 14C:
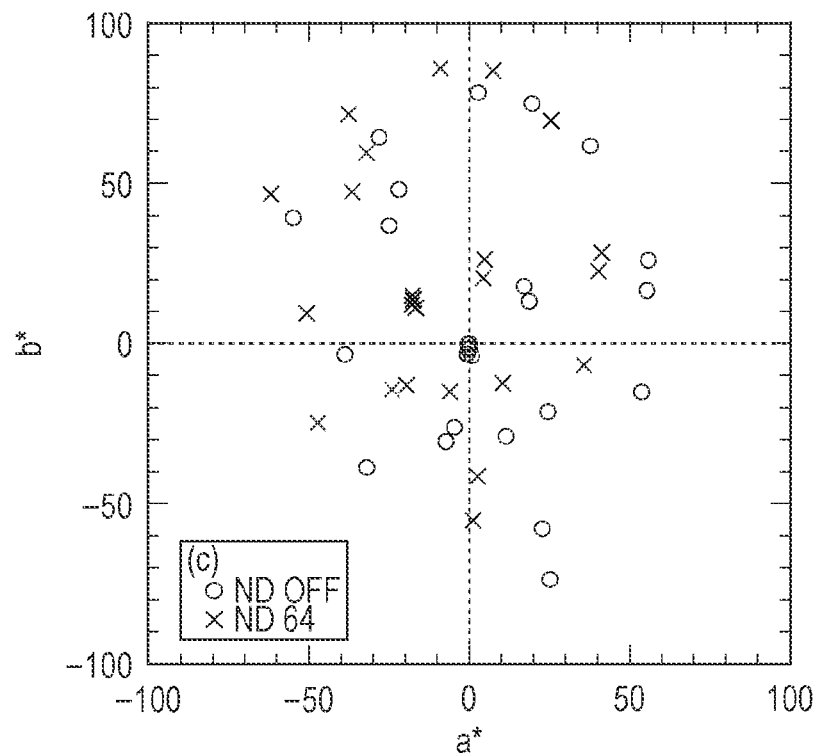
FIG. 14C illustrates a color change through an ND filter optimized by giving a high priority to wavelength flatness.
Figure 14D:
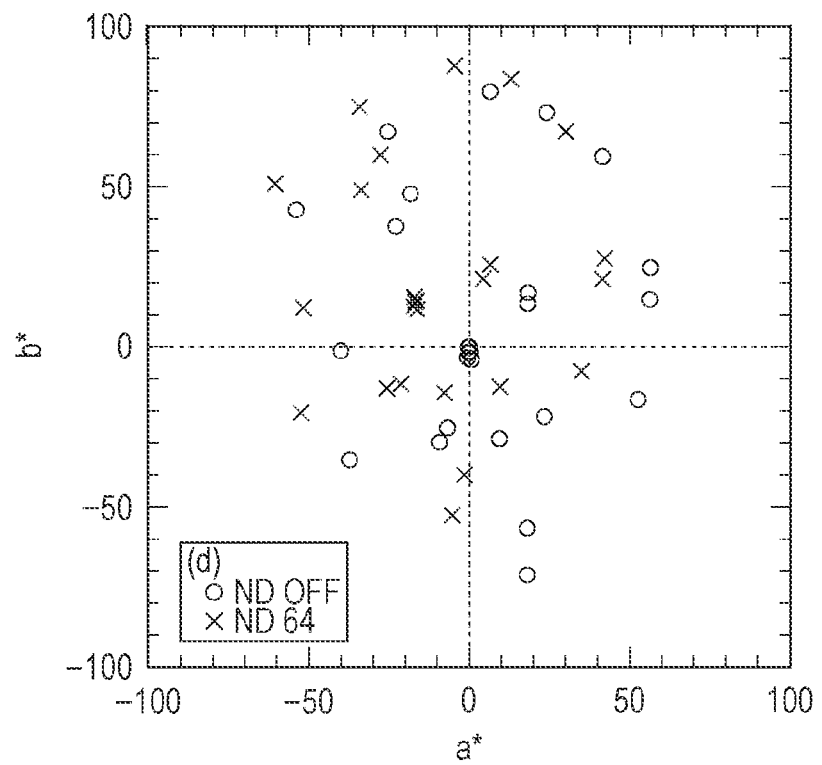
FIG. 14D illustrates a color change through an ND filter optimized by giving a high priority to wavelength flatness.

(A) Variable Transmittance VT(λ) Obtained by Giving Higher Priority to Reducing Change in Detection Signal Ratio ($CR_{Max}$) than to Improving Spectral Flatness FIG. 12A illustrates a variable transmittance VT(λ) spectrum optimized by combining Δε(λ) of the plurality of EC compounds (1) to (5) and (7) such that $CR_{Max}$ is decreased for various light sources illustrated in FIG. 3. Herein, the wavelength flatness TF in the detection light wavelength regions was 120%.

Table 3 shows CRMax calculated using the spectrum of natural light in the daytime in FIG. 3A and the spectra of light sources having color temperatures of 3200 K, 5600 K, and 8000 K in FIG. 3B. Table 4 shows the concentrations (unit: mmolL$^{-1}$) of the plurality of EC compounds (1) to (5) and (7) in the light reduction state.

TABLE 3

| Light source | Natural light in the daytime | 3200 K | 5600 K | 8000 K |
|---|---|---|---|---|
| $CR_{Max}$ | 1.05 | 1.03 | 1.03 | 1.04 |

TABLE 4

| | Anodic EC compound | | | | Cathodic EC compound | | | |
|---|---|---|---|---|---|---|---|---|
| | (1) | (2) | (3) | Total | (4) | (5) | (7) | Total |
| Concentration in light reduction state [mmolL$^{-1}$] | 2.2 | 40.9 | 24.1 | 67.1 | 20.3 | 1.2 | 45.6 | 67.1 |

Table 4 shows that the total charge concentration of the anodic EC compounds in the light reduction state is substantially equal to the total charge concentration of the cathodic EC compounds in the light reduction state.

(B) Variable Transmittance VTFP(λ) Obtained by Giving High Priority to Spectral Flatness FIG. 12B illustrates a variable transmittance $VT_{FP}$(2) by combining Δε(λ) of the plurality of EC compounds (1) to (5) and (7) such that the wavelength flatness of the variable transmittance is minimized by minimization calculation. The wavelength flatness TF in the detection light wavelength regions is 69.5%, which is the highest wavelength flatness $TF_{FP}$ in the combination of the compounds. Table 5 shows $CR_{Max}$ calculated using the spectrum of natural light in the daytime in FIG. 3A and the spectra of light sources having color temperatures 3200 K, 5600 K, and 8000 K in FIG. 3B. Table 6 shows the concentrations (unit: mmolL$^{-1}$) of the plurality of EC compounds (1) to (5) and (7) in the light reduction state.

TABLE 5

| Light source | Natural light in the daytime | 3200 K | 5600 K | 8000 K |
|---|---|---|---|---|
| $CR_{Max}$ | 1.13 | 1.15 | 1.17 | 1.17 |

TABLE 6

| | Anodic EC compound | | | | Cathodic EC compound | | | |
|---|---|---|---|---|---|---|---|---|
| | (1) | (2) | (3) | Total | (4) | (5) | (7) | Total |
| Concentration in light reduction state [mmolL$^{-1}$] | 10.1 | 26.9 | 29.2 | 66.3 | 22.2 | 3.2 | 40.9 | 66.3 |

Table 6 shows that the total charge concentration of the anodic EC compounds in the light reduction state is substantially equal to the total charge concentration of the cathodic EC compounds in the light reduction state.

Evaluation

FIG. 13 illustrates colors plotted on the a*b* plane of the L*a*b* space, the colors being obtained by capturing, as subjects, 24 patterns of a color checker using the variable transmittance VT(λ) spectrum obtained by giving a higher priority to reducing a change in the detection signal ratio ($CR_{Max}$) than to improving the spectral flatness in FIG. 12A, a plurality of light sources, and the spectral sensitivity in FIG. 2A. The light source in FIG. 13A is natural light in the daytime in FIG. 3A, the light source in FIG. 13B is a light source having a color temperature of 3200 K in FIG. 3B, the light source in FIG. 13C is a light source having a color temperature of 5600 K in FIG. 3B, and the light source in FIG. 13D is a light source having a color temperature of 8000 K in FIG. 3B. In this drawing, the color reproducibility increases as the distance between the plots in the transmission state of the ND filter and the plots in the light reduction state of the ND filter decreases.

FIG. 14 illustrates colors plotted on the a*b* plane of the L*a*b* space, the colors being obtained by capturing, as subjects, 24 patterns of a color checker using the variable transmittance $VT_{FP}$(λ) spectrum obtained by giving a high priority to spectral flatness in FIG. 12B, a plurality of light sources, and the spectral sensitivity in FIG. 2A. The same four types of light sources as in FIG. 13 were used.

The comparison between FIG. 13 and FIG. 14 shows that the ND filter having a high priority to $CR_{Max}$ in FIG. 13 has higher color reproducibility than the ND filter having a high priority to spectral flatness in FIG. 14. Table 7 shows the comparison of the maximum values of the color difference ($\Delta E_{00}$) of the 25 colors in each of the light sources.

TABLE 7

| Light source | Natural light in the daytime | 3200 K | 5600 K | 8000 K |
| --- | --- | --- | --- | --- |
| (A) High priority to $CR_{Max}$ | 6.7 | 5.3 | 6.9 | 7.1 |
| (B) High priority to spectral flatness | 19.4 | 21.3 | 21.2 | 21.1 |

This showed that even when the same compounds were combined with each other, the color reproducibility was about 2.9 to 4 times higher in the case where a high priority was given to $CR_{Max}$ as in the present invention than in the case where a high priority was given to spectral flatness. It was also found that high color reproducibility could be achieved regardless of the color temperature of the light source by using, for light sources having a medium color temperature, a low color temperature, and a high color temperature, the variable transmittance VT(λ) spectrum obtained by giving a higher priority to reducing a change in the detection signal ratio ($CR_{Max}$) that satisfied $CR_{Max} < CR_{MaxFP}$ than to improving the spectral flatness.

The present invention can provide a light-controlling device having high color reproducibility.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A light-controlling device comprising a plurality of compounds,
    wherein the plurality of compounds are compounds having different absorption wavelengths,
    the light-controlling device has a variable transmittance VT(λ) obtained by combining light absorption characteristics changes of the plurality of compounds, and $CR_{Max} < CR_{MaxFP}$ is satisfied,
    where $CR_{Max}$ is a maximum value among ratios of a signal strength ratio of transmitted light in a transmission state and a signal strength ratio of transmitted light in a light reduction state (light reduction state/transmission state or transmission state/light reduction state) in detection light wavelength regions of a photodetector, and
    $CR_{MaxFP}$ is $CR_{Max}$ at a concentration ratio of the plurality of compounds at which wavelength flatness TF of VT(λ) in the detection light wavelength regions has a minimum value $TF_{FP}$.

2. The light-controlling device according to claim 1, wherein $CR_{Max}$ is 1.11 or less.

3. The light-controlling device according to claim 2, wherein $CR_{Max}$ is 1.05 or less.

4. The light-controlling device according to claim 3, wherein $CR_{Max}$ is 1.023 or less.

5. The light-controlling device according to claim 1, wherein the plurality of compounds are compounds whose light transmission characteristics electrically change.

6. The light-controlling device according to claim 1, wherein the plurality of compounds are electrochromic compounds.

7. The light-controlling device according to claim 1, wherein the light-controlling device is a complementary electrochromic device containing at least one anodic electrochromic compound and at least one cathodic electrochromic compound, and a total charge concentration of the anodic electrochromic compound in a light reduction state is substantially equal to a total charge concentration of the cathodic electrochromic compound in a light reduction state.

8. The light-controlling device according to claim 1, wherein the plurality of compounds are three or more compounds.

9. The light-controlling device according to claim 8, wherein the plurality of compounds are six or more compounds.

10. The light-controlling device according to claim 7, wherein the at least one anodic electrochromic compound comprises a plurality of compounds and the at least one cathodic electrochromic compound comprises a plurality of compounds.

11. The light-controlling device according to claim 1, wherein at least one compound selected from the plurality of compounds has a peak of a variable absorption spectrum in each of the detection light wavelength regions of the photodetector.

12. The light-controlling device according to claim 1, wherein light-source-emitting light incident on the light-controlling device is natural light in the daytime.

13. The light-controlling device according to claim 1, wherein a color temperature of the light-source-emitting light incident on the light-controlling device is a medium color temperature of 4000 K to 7000 K.

14. The light-controlling device according to claim 1, wherein a color temperature of the light-source-emitting light incident on the light-controlling device is a low color temperature of 1800 K to 4000, a medium color temperature of 4000 K to 7000 K, or a high color temperature of 7000 K to 12000 K.

15. The light-controlling device according to claim 1, wherein the light-controlling device supports at least the medium color temperature and also supports the low color temperature and the high color temperature in terms of color temperature of the light-source-emitting light incident on the light-controlling device.

16. The light-controlling device according to claim 1, wherein the photodetector is an image pickup element.

17. The light-controlling device according to claim 1, wherein the photodetector is a human eye.

18. The light-controlling device according to claim 1, wherein a light reduction ratio (light intensity ratio at transmission state/light reduction state) is 8 or more.

19. The light-controlling device according to claim 18, wherein the light reduction ratio is 32 or more.

20. The light-controlling device according to claim 1, wherein $TF > TF_{FP}$ is satisfied.

21. An optical filter comprising the light-controlling device according to claim 1.

22. The optical filter according to claim 21, wherein the optical filter is a variable ND filter.

23. A lens unit comprising the optical filter according to claim 21 and an image pickup optical system including a plurality of lenses.

24. An image pickup apparatus comprising the optical filter according to claim 21 and an image pickup element for receiving light that has passed through the optical filter.

25. A window member comprising the light-controlling device according to claim 1.

26. Glasses comprising the light-controlling device according to claim 1.

27. A mirror comprising the light-controlling device according to claim 1.

* * * * *